(12) United States Patent
Scarfutti et al.

(10) Patent No.: US 11,928,626 B2
(45) Date of Patent: Mar. 12, 2024

(54) SYSTEM AND METHOD FOR PERSISTING DATA GENERATED IN EXECUTING A PROCESS WORKFLOW

(71) Applicant: The Toronto-Dominion Bank, Toronto (CA)

(72) Inventors: Joseph Vincent Scarfutti, Brooklyn, NY (US); Christian Caberoy De La Peña, Chester, NY (US); Aneesha Suresh Bulchandani, Hoboken, NJ (US)

(73) Assignee: The Toronto-Dominion Bank, Toronto (CA)

( * ) Notice: Subject to any disclaimer, the term of this patent is extended or adjusted under 35 U.S.C. 154(b) by 229 days.

(21) Appl. No.: 17/302,093

(22) Filed: Apr. 23, 2021

(65) Prior Publication Data

US 2022/0215304 A1 Jul. 7, 2022
US 2023/0206151 A9 Jun. 29, 2023

Related U.S. Application Data

(63) Continuation-in-part of application No. 17/248,060, filed on Jan. 7, 2021, now Pat. No. 11,449,312.

(51) Int. Cl.
*G06F 9/44* (2018.01)
*G06F 9/54* (2006.01)
(Continued)

(52) U.S. Cl.
CPC ......... *G06Q 10/0633* (2013.01); *G06F 9/546* (2013.01); *G06F 16/212* (2019.01); *G06F 16/2477* (2019.01)

(58) Field of Classification Search
CPC ............ G06Q 10/0633; G06F 16/2477; G06F 16/212; G06F 9/546
(Continued)

(56) References Cited

U.S. PATENT DOCUMENTS 7,240,324 B2 7/2007 Casati
7,349,980 B1 3/2008 Darugar
(Continued)

OTHER PUBLICATIONS

Brosey, W.D. et al., "Grand Challenges of Enterprise Integration," ETFA 2001. International Conference on Emerging Technologies and Factory Automation. 2001, pp. 221-227 vol. 2.
(Continued)

*Primary Examiner* — Chuck O Kendall
(74) *Attorney, Agent, or Firm* — CPST Intellectual Property Inc.; Brett J. Slaney

(57) ABSTRACT

A system and method are provided for persisting data generated in executing a process workflow. The method is executed by a device having a communications module and includes receiving via the communications module messages exchanged in executing the process workflow by a message broker. The method also includes using a writer service to disassemble each received message into multiple properties according to a database schema and persist the received message in a database according to the database schema via the communications module. The method also includes using a reader service to access the database and assemble the multiple properties of a first persisted message, in response to a read request received via the communications module, wherein the reader service is separate from the writer service.

20 Claims, 31 Drawing Sheets

(51) Int. Cl.
  *G06F 16/21* (2019.01)
  *G06F 16/2458* (2019.01)
  *G06Q 10/0633* (2023.01)
(58) Field of Classification Search
  USPC .................................. 717/105–109, 120–122
  See application file for complete search history.

(56) References Cited

U.S. PATENT DOCUMENTS

| | | | |
|---|---|---|---|
| 7,653,008 | B2 | 1/2010 | Patrick et al. |
| 8,307,294 | B2 | 11/2012 | Luo et al. |
| 8,656,352 | B2 | 2/2014 | Szpak et al. |
| 10,261,757 | B2 | 4/2019 | Harrill et al. |
| 10,423,393 | B2 | 9/2019 | Lam et al. |
| 10,423,445 | B2 | 9/2019 | Mishra |
| 10,423,912 | B2 | 9/2019 | Garcia et al. |
| 10,692,030 | B2 | 6/2020 | Haligowski et al. |
| 2005/0044127 | A1 | 2/2005 | Jaiswal |
| 2006/0074714 | A1 | 4/2006 | Aziz |
| 2006/0155581 | A1 | 7/2006 | Eisenberger |
| 2009/0006997 | A1 | 1/2009 | Jiang et al. |
| 2009/0165021 | A1* | 6/2009 | Pinkston ................ G06F 9/546 719/314 |
| 2010/0131554 | A1 | 5/2010 | Cooper |
| 2010/0254395 | A1 | 10/2010 | Smith |
| 2013/0152038 | A1 | 6/2013 | Lim et al. |
| 2015/0312179 | A1 | 10/2015 | Ben-Ezra |
| 2016/0259534 | A1 | 9/2016 | Simons et al. |
| 2017/0039501 | A1 | 2/2017 | Deguchi |
| 2017/0075721 | A1 | 3/2017 | Bishop |
| 2018/0005186 | A1* | 1/2018 | Hunn ...................... G06F 16/93 |
| 2018/0349134 | A1* | 12/2018 | Studer ...................... G06F 9/451 |
| 2019/0205792 | A1 | 7/2019 | Huang |
| 2019/0354411 | A1 | 11/2019 | Raikov |
| 2019/0392617 | A1 | 12/2019 | Laetham |
| 2020/0067903 | A1 | 2/2020 | Yegorin |
| 2020/0111041 | A1 | 4/2020 | Levine et al. |
| 2020/0201525 | A1 | 6/2020 | Chin |
| 2020/0242530 | A1 | 7/2020 | Ward, IV |
| 2021/0182996 | A1 | 6/2021 | Cella |

OTHER PUBLICATIONS

O'Hara, John, "Toward a Commodity Enterprise Middleware", ACM Queue, vol. 5., No. 4., pp. 48-55 (2007).
Fowler, Martin; Command Query Responsiblity Segregation; https://martinfowler.com/bliki/CQRS/html.
U.S. Appl. No. 17/248,060, filed Jan. 7, 2021.
Oberhauser, Roy, and Stigler, Sebastian; "Microflows: enabling agile business process modeling to orchestrate semantically-annotated microservices." Seventh International Symposium on Business Modeling and Software Design (BMSD 2017), vol. 1.2017. U), vol. 1; 2017.

* cited by examiner

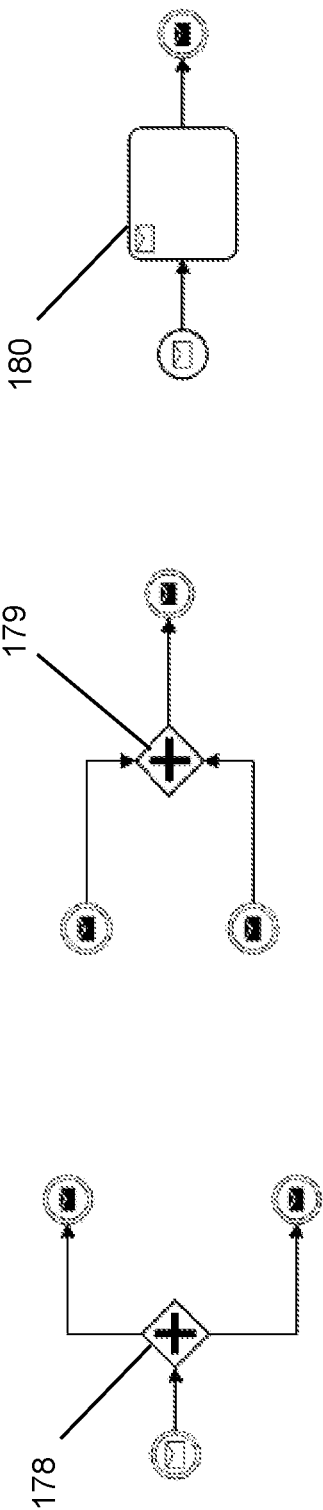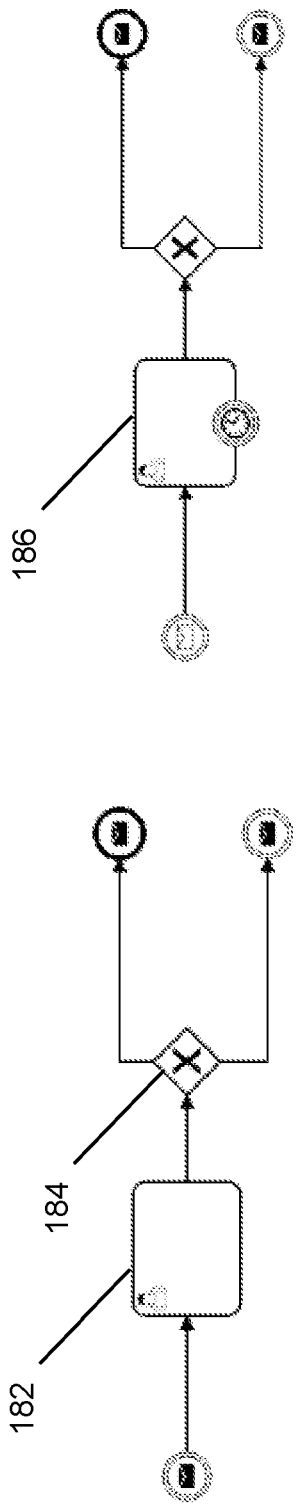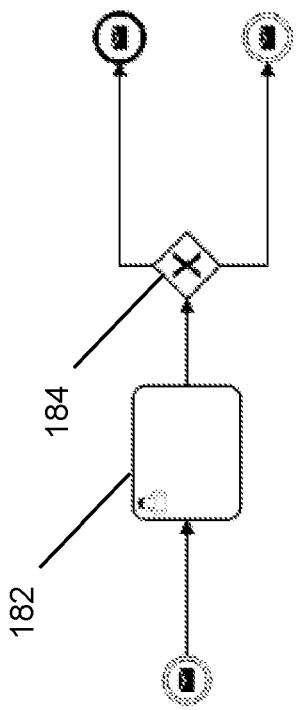
FIG. 10
FIG. 11
FIG. 12
FIG. 13
FIG. 14

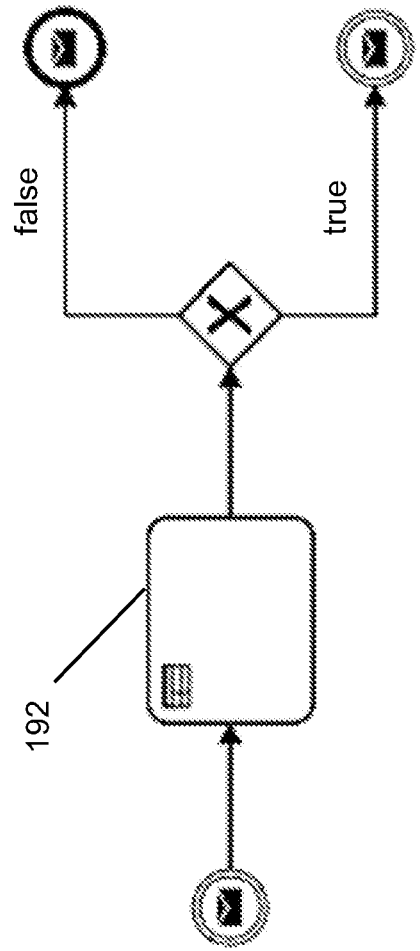
FIG. 17
FIG. 15
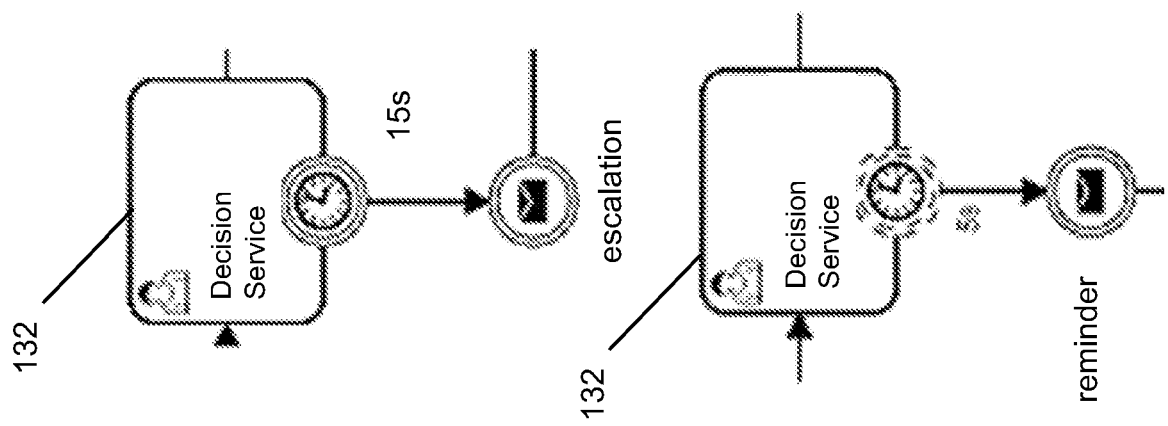
FIG. 16

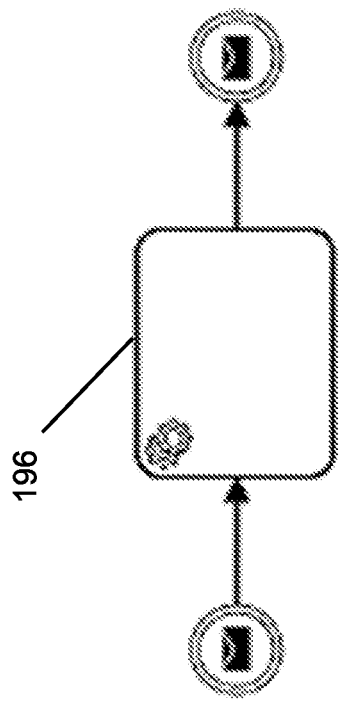
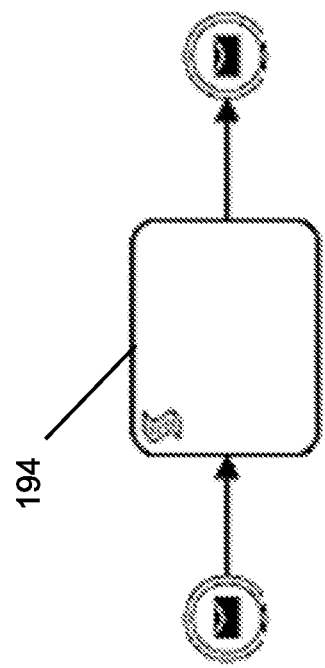
FIG. 18
FIG. 19
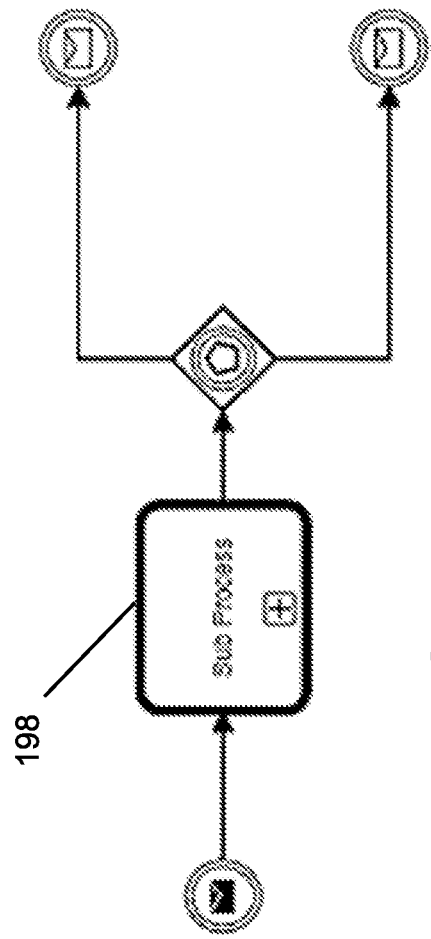
FIG. 20

SYSTEM AND METHOD FOR PERSISTING DATA GENERATED IN EXECUTING A PROCESS WORKFLOW

CROSS-REFERENCE TO RELATED APPLICATION(S)

This application is a continuation-in-part of U.S. patent application Ser. No. 17/248,060 filed on Jan. 7, 2021, the entire contents of which are incorporated herein by reference.

TECHNICAL FIELD

The following relates generally to persisting data generated in executing process workflows.

BACKGROUND

As digital systems and user or process requirements for these systems become more complicated and demanding, business process management becomes more challenging and complicated to implement. It is typically found that few (if any) existing tools are capable of adapting to generic and intrinsic items normally required in these business processes. For example, a business process may require sequential checks, gates, and approvals as well as data enrichment, aggregation, and appending. These tasks can require customized programming and can increase complexities in the end product or service. Other challenges can be introduced because of document parsing, document matching, data distribution and transmission, time series analyses, and web publishing.

BRIEF DESCRIPTION OF THE DRAWINGS

Embodiments will now be described with reference to the appended drawings wherein:

FIGS. 8-20 are flow diagrams illustrating task types.

DETAILED DESCRIPTION

Figure 1:
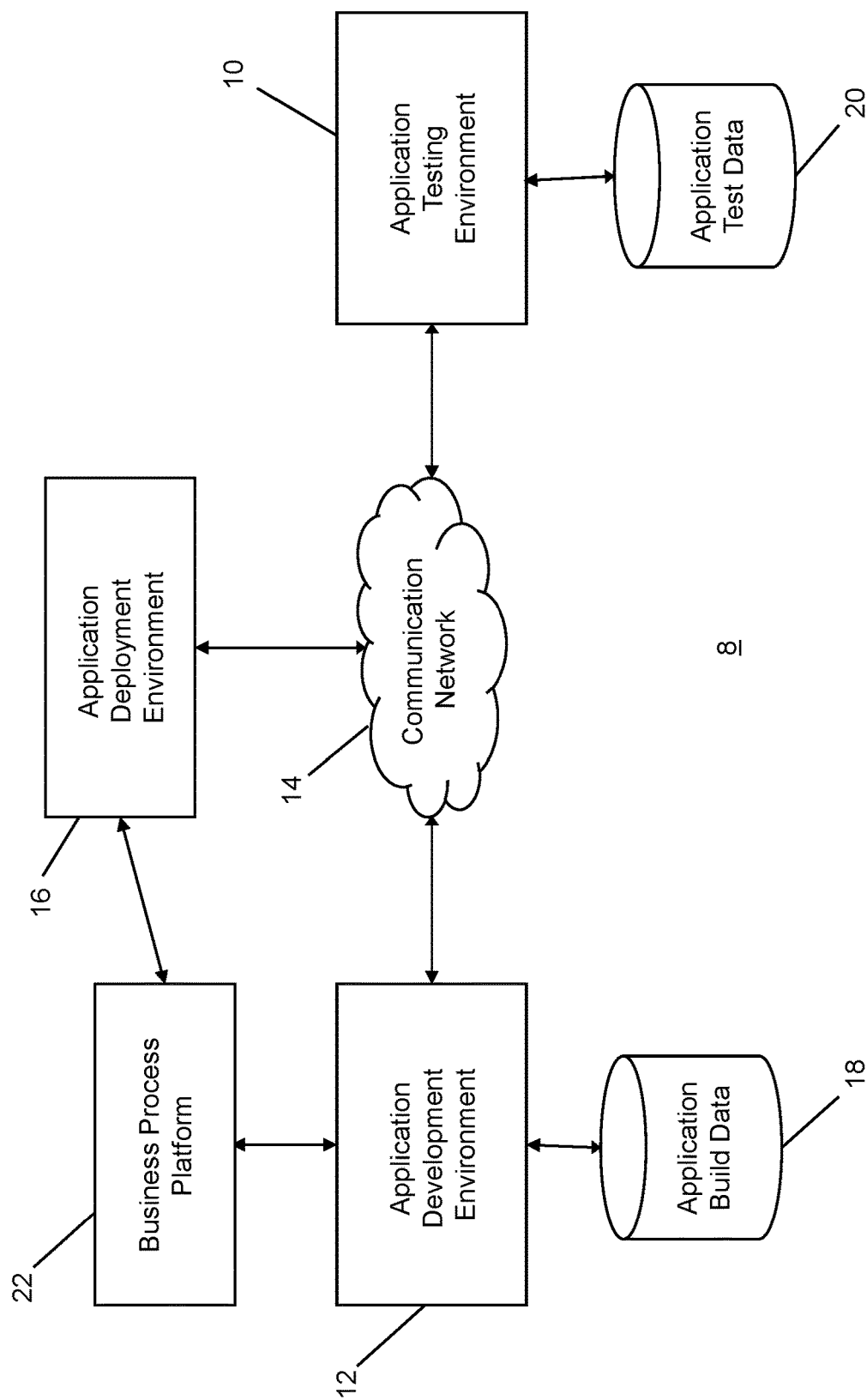
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is found that many items in a business process can be generic and intrinsic to several processes and applications, particularly within an organization. These can include, for example, business process management, sequential checks/gates/approvals, data enrichment/aggregation/appending, document parsing, document matching, data distribution and transmission, time series analyses, web publishing, etc. Mapping microservices for such business functions can facilitate cross-skill understanding and development. Moreover, this can provide modularity that allows future challenges and opportunities to be met quickly and efficiently using agnostic microservices that can be used to flexibly onboard functional extensions or changes to a process.

A state machine system or "platform" is described herein, which abstracts process orchestration from the user via a state machine and provides a user interface (UI) design tool to allow a business-function oriented approach to workflow design and representation as a graph. The systems described herein can include a streaming distribution and routing layer that offers a normalized paradigm for function integration and onboarding, and includes multiple tiers for resiliency, performance and recovery. The system can rely on a number of functional business services, which can be implemented as microservices.

With this system, a business process can be created and stored as a graph. Also, the system can employ dynamic routing, functional declarations for application onboarding, and a standard integration paradigm to facilitate federated building of a microservice layer. The system can also persist messages in a queue and employ a database for message recovery. The UI on top of the system provides for low- or no-code implementation of a process from building blocks associated with the graph structure.

The following generally relates to executing process workflows, e.g., in implementing a digital application, in particular for designing, implementing, and executing business process workflows using a workflow graph stored in a graph database.

Certain example systems and methods described herein are able to persist data generated in executing process workflows. In one aspect, there is provided a device for persisting data generated in executing a process workflow. The device includes a processor, a communications module coupled to the processor, and a memory coupled to the processor. The memory stores computer executable instructions that when executed by the processor cause the processor to receive via the communications module messages exchanged in executing the process workflow by a message broker. The computer executable instructions, when executed, also cause the processor to use a writer service to disassemble each received message into multiple properties according to a database schema and persist the received message in a database according to the database schema via the communications module. The computer executable instructions, when executed, also cause the processor to use a reader service to access the database and assemble the multiple properties of a first persisted message, in response to a read request received via the communications module, wherein the reader service is separate from the writer service.

In another aspect, there is provided a method of persisting data generated in executing a process workflow. The method is executed by a device having a communications module and includes receiving via the communications module messages exchanged in executing the process workflow by a message broker. The method also includes using a writer service to disassemble each received message into multiple properties according to a database schema and persist the received message in a database according to the database schema via the communications module. The method also includes using a reader service to access the database and assemble the multiple properties of a first persisted message, in response to a read request received via the communications module, wherein the reader service is separate from the writer service.

In another aspect, there is provided a non-transitory computer readable medium for persisting data generated in executing a process workflow. The computer readable medium includes computer executable instructions for receiving via a communications module messages exchanged in executing the process workflow by a message broker. The computer readable medium also includes instructions for using a writer service to disassemble each received message into multiple properties according to a database schema and persist the received message in a database according to the database schema via the communications module. The computer readable medium also includes instructions for using a reader service to access the database and assemble the multiple properties of a first persisted message, in response to a read request received via the communications module, wherein the reader service is separate from the writer service.

In certain example embodiments, the method can further include receiving a temporal query for the first or a second persisted message comprising an as-of time and assembling the first or second persisted message according to the multiple properties of that message at the as-of time. The as-of time can correspond to a given point in a graph defining the process workflow.

In certain example embodiments, at least one of the received messages can be provided by a routing service used to perform dynamic routing on documents in the process workflow.

In certain example embodiments, at least one of the received messages can be provided by an integration service used to integrate external microservices used in executing the process workflow.

In certain example embodiments, the database schema can adhere to a data dictionary defining the schema for a record in the database.

In certain example embodiments, the method can further include enabling different instances of a same category of objects to have different runtime properties.

In certain example embodiments, the separate reader and writer services can enable targeted scaling to permit differing read and write workloads.

In certain example embodiments, the method can further include serializing write requests through the message broker without losing data.

In certain example embodiments, the database schema can use the following set of logical entities to describe and capture information in the messages: a quantum corresponding to an object, a quantum type corresponding to a unique name identifying a category of objects, at least one quantum property corresponding to a characteristic of the object, a quantum state corresponding to the object in observation, created when the quantum acquires information; and a state vector recording values assigned to a quantum property for a quantum state.

FIG. 1 illustrates an exemplary computing environment 8. In this example, the computing environment 8 may include an application testing environment 10, an application development environment 12, and a communications network 14 connecting one or more components of the computing environment 8. The computing environment 8 may also include or otherwise be connected to an application deployment environment 16, which provides a platform, service, or other entity responsible for posting or providing access to applications that are ready for use by client devices. The computing environment may also include or otherwise be connected to a business process platform 22, which provides a platform, service or other entity responsible for designing, executing, and deploying business process workflows, whether separate from or in connection with an application developed in the application development environment 12. The application development environment 12 includes or is otherwise coupled to one or more repositories or other data storage elements for storing application build data 18.

As used herein a "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance related metrics.

The application build data 18 can include any computer code and related data and information for an application to be deployed, e.g., for testing, execution or other uses. The application build data 18 can also include any computer code and related data and information for a business process workflow implemented by the business process platform 22. In this example, the application build data 18 can be provided via one or more repositories and include the data and code required to perform application testing on a device or simulator.

The application testing environment 10 may include or otherwise have access to one or more repositories or other data storage elements for storing application test data 20, which includes any files, reports, information, results, metadata or other data associated with and/or generated during a test implemented within the application testing environment 10.

The computing environment 8 may be part of an enterprise or other organization that both develops and tests applications and/or designs and implements business process workflows. In such cases, the communication network 14 may not be required to provide connectivity between the application development environment 12, the application testing environment 10, and business process platform 22, wherein such connectivity is provided by an internal network. The application development environment 12, application testing environment 10, and/or business process platform 22, may also be integrated into the same enterprise environment as subsets thereof. That is, the configuration shown in FIG. 1 is illustrative only. Moreover, the computing environment 8 can include multiple enterprises or organizations, e.g., wherein separate organizations are configured to, and responsible for, application testing and application development, and/or business process workflows. For example, an organization may contract a third-party to develop an app for their organization but perform testing internally to meet proprietary or regulatory requirements. Similarly, an organization that develops an app may outsource the testing stages, particularly when testing is performed infrequently. The application deployment environment 16 may likewise be implemented in several different ways. For example, the deployment environment 16 may include an internal deployment channel for employee devices, may include a public marketplace such as an app store, or may include any other channel that can make the app available to clients, consumers or other users.

One example of the computing environment 8 may include a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Users of applications or business processes described herein may be referred to as customers, clients, correspondents, or other entities that interact with the enterprise or organization associated with the computing environment 8 via one or more apps or workflows (which may employ one or more apps). Such users typically interact with the environment 8 using client communication devices. It may be noted that such client communication devices may be connectable to the application deployment environment 16, e.g., to download newly developed apps, to update existing apps, etc. In certain embodiments, a user may operate the client communication devices such that client device performs one or more processes consistent with what is being developed or tested in the disclosed embodiments. For example, the user may use client device to engage and interface with a mobile or web-based banking application which has been developed and tested within the computing environment 8 as herein described. In certain aspects, client communication devices can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 14 shown by way of example in FIG. 1.

Communication network 14 may include a telephone network, cellular, and/or data communication network to connect different types of client devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Referring back to FIG. 1, the computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the application development environment 12 and/or application testing environment 10. The cryptographic server may be used to protect data within the computing environment 8 (include the application build data 18 and/or application test data 20) by way of encryption for data protection, digital signatures or message digests for data integrity, and by using digital certificates to authenticate the identity of the users and entity devices with which the application development environment 12, business process platform 22, and application testing environment 10 communicate to inhibit data breaches by adversaries. It can be appreciated that various cryptographic mechanisms and protocols can be chosen and implemented to suit the constraints and requirements of the particular deployment of the application development environment 12, business process platform 22, and application testing environment 10 as is known in the art.

Figure 2:
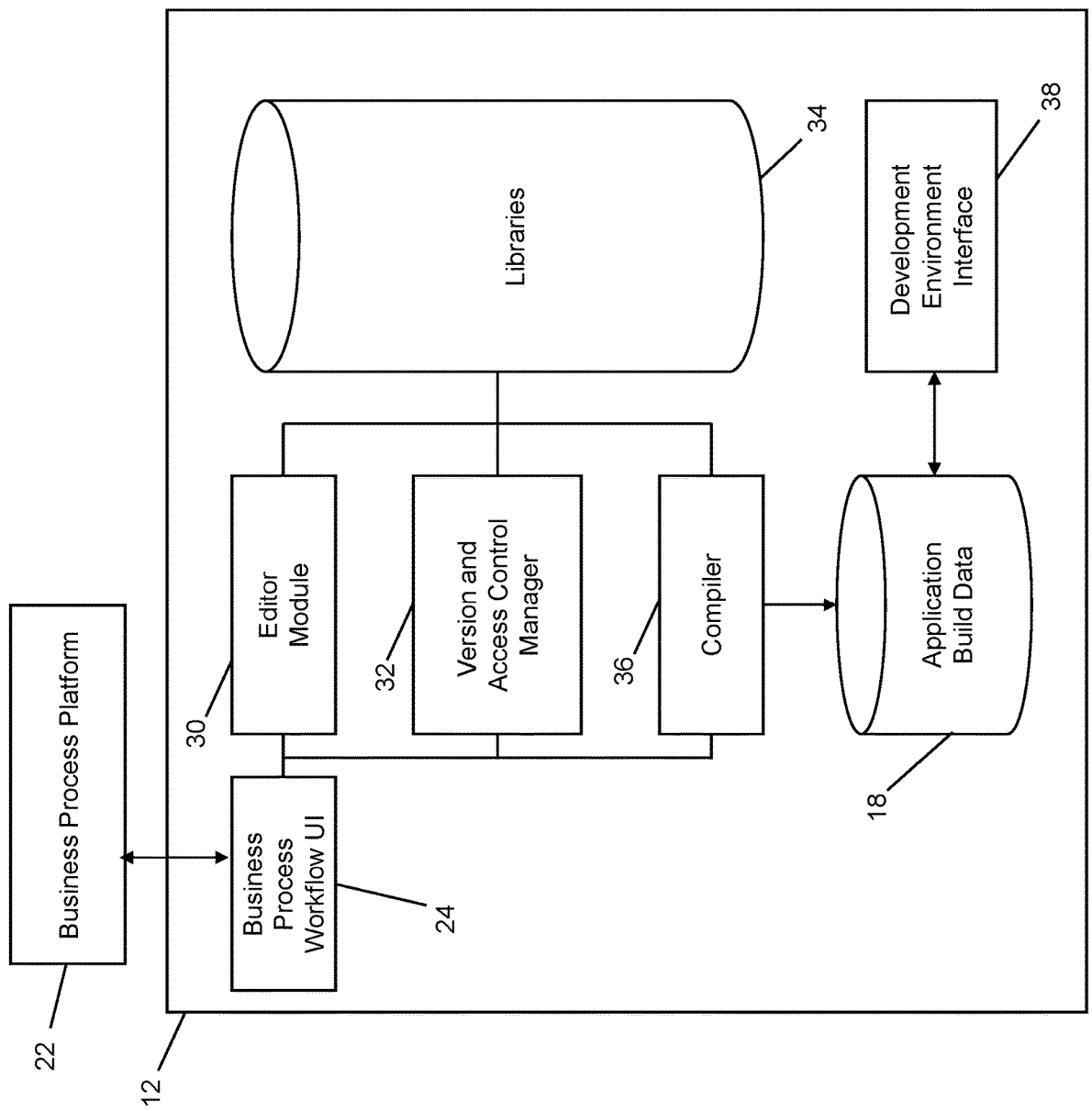
FIG. 2 is a block diagram of an example configuration of an application development environment.

In FIG. 2, an example configuration of the application development environment 12 is shown. It can be appreciated that the configuration shown in FIG. 2 has been simplified for ease of illustration. In certain example embodiments, the application development environment 12 may include an editor module 30, a version and access control manager 32, one or more libraries 34, and a compiler 36, which would be typical components utilized in application development. In this example, the application development environment 12 also includes the application build data 18, which, while shown within the environment 12, may also be a separate entity (e.g., repository) used to store and provide access to the stored build files. The application development environment 12 also includes or is provided with (e.g., via an application programming interface (API)), a development environment interface 38. The development environment interface 38 provides communication and data transfer capabilities between the application development environment 12 and the application testing environment 10 from the perspective of the application development environment 12, As shown in FIG. 2, the development environment interface 38 can connect to the communication network 14 to send/receive data and communications to/from the application testing environment 10, For example, the testing environment interface 38 can be used to provide test results to the application development environment 12 based on testing conducted in the application testing environment 10.

The editor module 30 can be used by a developer/programmer to create and edit program code associated with an application being developed. This can include interacting with the version and access control manager 32 to control access to current build files and libraries 34 while enforcing permissions and version controls. The compiler 36 may then be used to compile an application build file and other data to be stored with the application build data 18. It can be appreciated that a typical application or software development environment 12 may include other functionality, modules, and systems, details of which are omitted for brevity and ease of illustration. It can also be appreciated that the application development environment 12 may include modules, accounts, and access controls for enabling multiple developers to participate in developing an application, and modules for enabling an application to be developed for multiple platforms. For example, a mobile application may be developed by multiple teams, each team potentially having multiple programmers. Also, each team may be responsible for developing the application on a different platform, such as Apple iOS or Google Android for mobile versions, and Google Chrome or Microsoft Edge for web browser versions. Similarly, applications may be developed for deployment on different device types, even with the same underlying operating system.

While not shown in FIG. 2 for clarity of illustration, in example embodiments, the application development environment 12 may be implemented using one or more computing devices such as terminals, servers, and/or databases, having one or more processors, communications modules, and database interfaces. Such communications modules may include the development environment interface 38, which enables the application development environment 12 to communicate with one or more other components of the computing environment 8, such as the application testing environment 10, via a bus or other communication network, such as the communication network 14. While not delineated in FIG. 2, the application development environment 12 (and any of its devices, servers, databases, etc.) includes at least one memory or memory device that can include a tangible and non-transitory computer-readable medium having stored therein computer programs, sets of instructions, code, or data to be executed by the one or more processors. FIG. 2 illustrates examples of modules, tools and engines stored in memory within the application development environment 12. It can be appreciated that any of the modules, tools, and engines shown in FIG. 2 may also be hosted externally and be available to the application development environment 12, e.g., via communications modules such as the development environment interface 38.

In this example embodiment, the application development environment 12 can include, a business process workflow UI 24 that can integrate or interface with the editor module 30 to enable business process workflows to be designed and integrated with an application that is being developed. The business process workflow UI 24 can also be connectable to the business process platform 22 to allow business process workflows to communicate and/or integrate with application functionality both within an application or between multiple applications.

Figure 3:
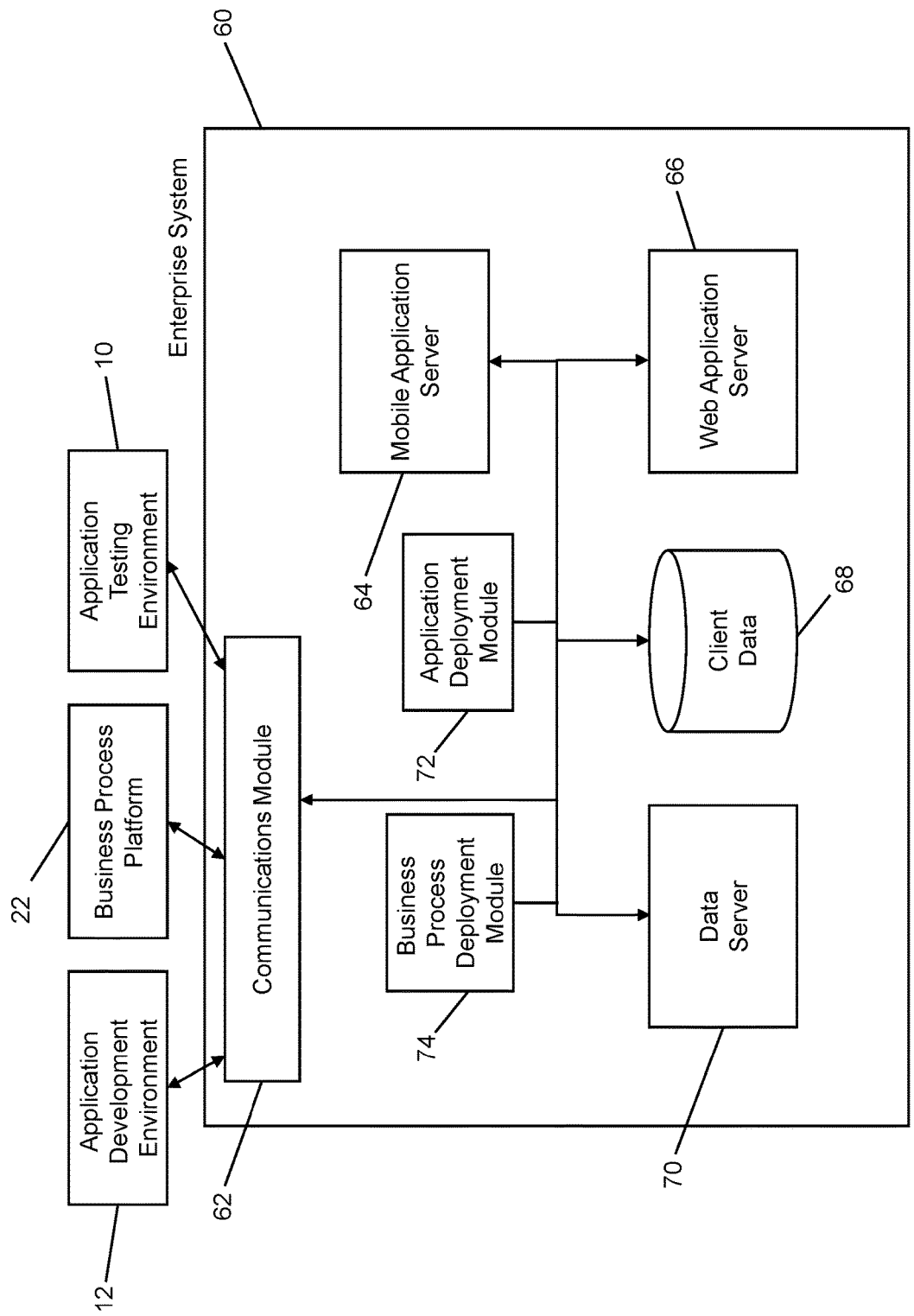
FIG. 3 is a block diagram of an example configuration of an enterprise system.

In FIG. 3, an example configuration of an enterprise system 60 is shown. The enterprise system 60 includes a communications module 62 that enables the enterprise system 60 to communicate with one or more other components of the computing environment 8, such as the application testing environment 10, business process platform 22, or application development environment 12, via a bus or other communication network, such as the communication network 14. While not delineated in FIG. 3, the enterprise system 60 includes at least one memory or memory device that can include a tangible and non-transitory computer-readable medium having stored therein computer programs, sets of instructions, code, or data to be executed by one or more processors (not shown for clarity of illustration). FIG. 3 illustrates examples of servers and datastores/databases operable within the enterprise system 60. It can be appreciated that any of the components shown in FIG. 3 may also be hosted externally and be available to the enterprise system 60, e.g., via the communications module 62. In the example embodiment shown in FIG. 3, the enterprise system 60 includes one or more servers to provide access to client data 68, e.g., for development or testing purposes. Exemplary servers include a mobile application server 64, a web application server 66 and a data server 70. Although not shown in FIG. 3, as noted above, the enterprise system 60 may also include a cryptographic server for performing cryptographic operations and providing cryptographic services. The cryptographic server can also be configured to communicate and operate with a cryptographic infrastructure. The enterprise system 60 may also include one or more data storage elements for storing and providing data for use in such services, such as data storage for storing client data 68.

Mobile application server 64 supports interactions with a mobile application installed on client device (which may be similar or the same as a test device). Mobile application server 64 can access other resources of the enterprise system 60 to carry out requests made by, and to provide content and data to, a mobile application on client device. In certain example embodiments, mobile application server 64 supports a mobile banking application to provide payments from one or more accounts of user, among other things.

Web application server 66 supports interactions using a website accessed by a web browser application running on the client device. It can be appreciated that the mobile application server 64 and the web application server 66 can provide different front ends for the same application, that is, the mobile (app) and web (browser) versions of the same application. For example, the enterprise system 60 may provide a banking application that be accessed via a smartphone or tablet app while also being accessible via a browser on any browser-enabled device.

The client data 68 can include, in an example embodiment, financial data that is associated with users of the client devices (e.g., customers of the financial institution). The financial data may include any data related to or derived from financial values or metrics associated with customers of a financial institution system (i.e., the enterprise system 60 in this example), for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices.

An application deployment module 72 is also shown in the example configuration of FIG. 3 to illustrate that the enterprise system 60 can provide its own mechanism to deploy the developed and tested applications onto client devices within the enterprise. It can be appreciated that the application deployment module 72 can be utilized in conjunction with a third-party deployment environment 16 such as an app store to have tested applications deployed to employees and customers/clients.

It will be appreciated that only certain modules, applications, tools and engines are shown in FIGS. 2 and 3 for ease of illustration and various other components would be provided and utilized by the application development environment 12 and enterprise system 60, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in the application testing environment 10, application development environment 12, business process platform 22, enterprise system 60, or accessible or connectable thereto. Any application or module herein described may be implemented using computer readable/executable instructions that may be stored or otherwise held by such computer readable media.

Figure 4:
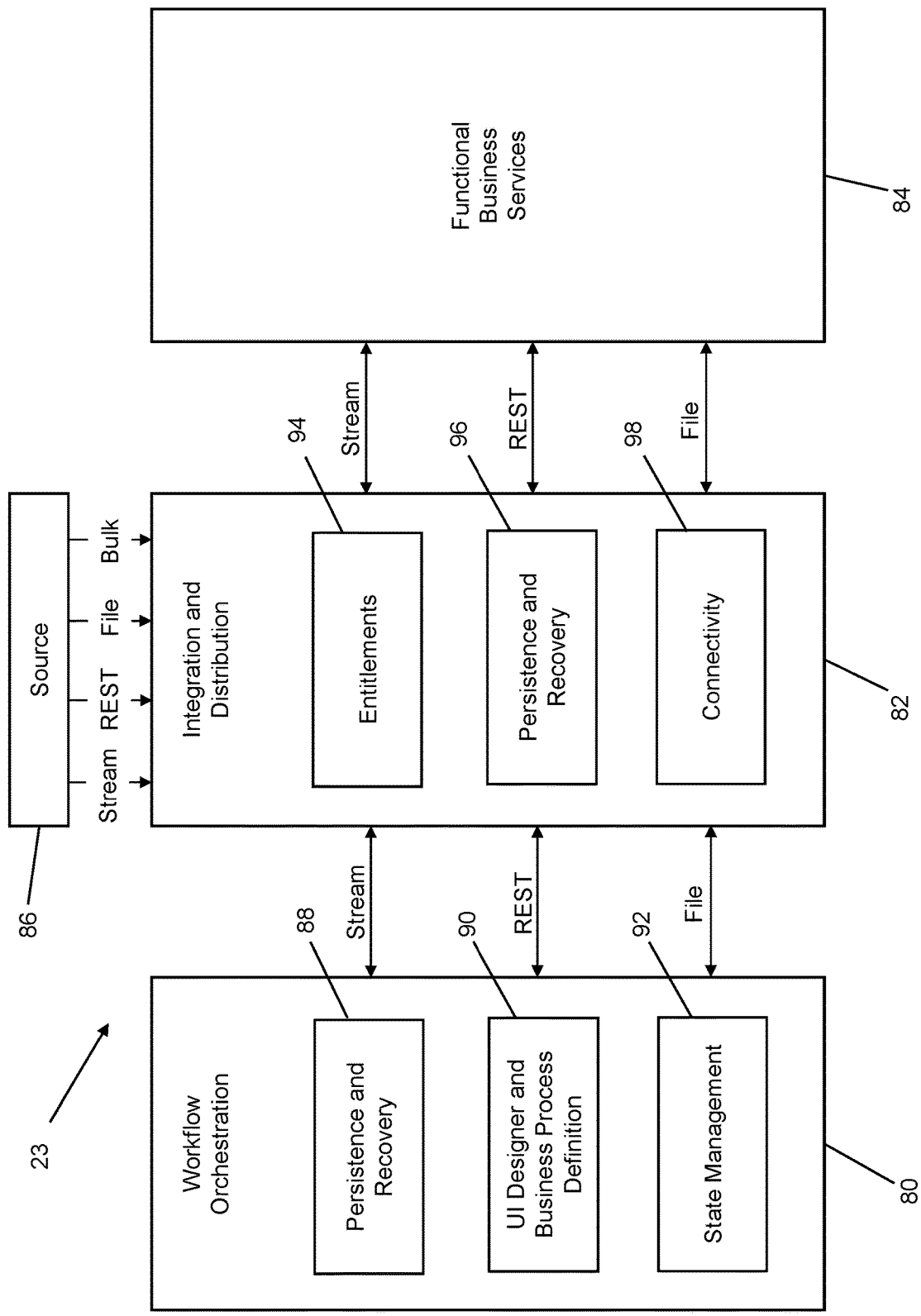
FIG. 4 is a block diagram of an example configuration of a workflow orchestration solution for a business process platform.

Referring to FIG. 4, a block diagram of an example configuration of a workflow orchestration system 23 for the business process platform 22 is shown. The configuration shown in FIG. 4 illustrates three components, workflow orchestration 80, integration and distribution 82, and functional business services 84. This configuration provides an implementation that is agnostic to functional services, which can be custom built or "off-the-shelf". The workflow orchestration 80 can include functionality to enable business process workflow design and visualization and the integration and distribution 82 can implement the business process workflows to meet certain business and technical objectives. As shown in FIG. 4, the workflow orchestration component 80 can include a persistence and recovery module 88, a UI designer and business process definition module 90, and a state management module 92. The integration and distribution component 82 includes an entitlements module 94, a persistence and recovery module 96, and a connectivity module 98. The components 80, 82, 84 can communicate with each other using various protocols and commands, for example, Stream, Representational State Transfer (REST), and File operations.

Also shown in FIG. 4 is a source component 86 that can integrate and/or communicate with the integration and distribution component 82 using Stream, REST, File and Bulk operations to provide data to the system 23. It can be appreciated that the workflow orchestration component 80 can be abstracted from the user via the state machine provided by the system 23. The UI designer module 90 allows for a business-function oriented approach to workflow design and, as discussed further below, enables the workflow to be represented as a graph. The streaming distribution layer (providing the Stream operations) offers a normalized paradigm for function integration and onboarding. Moreover, the system 23 includes resiliency for persistence and recovery in multiple tiers.

Figure 5:
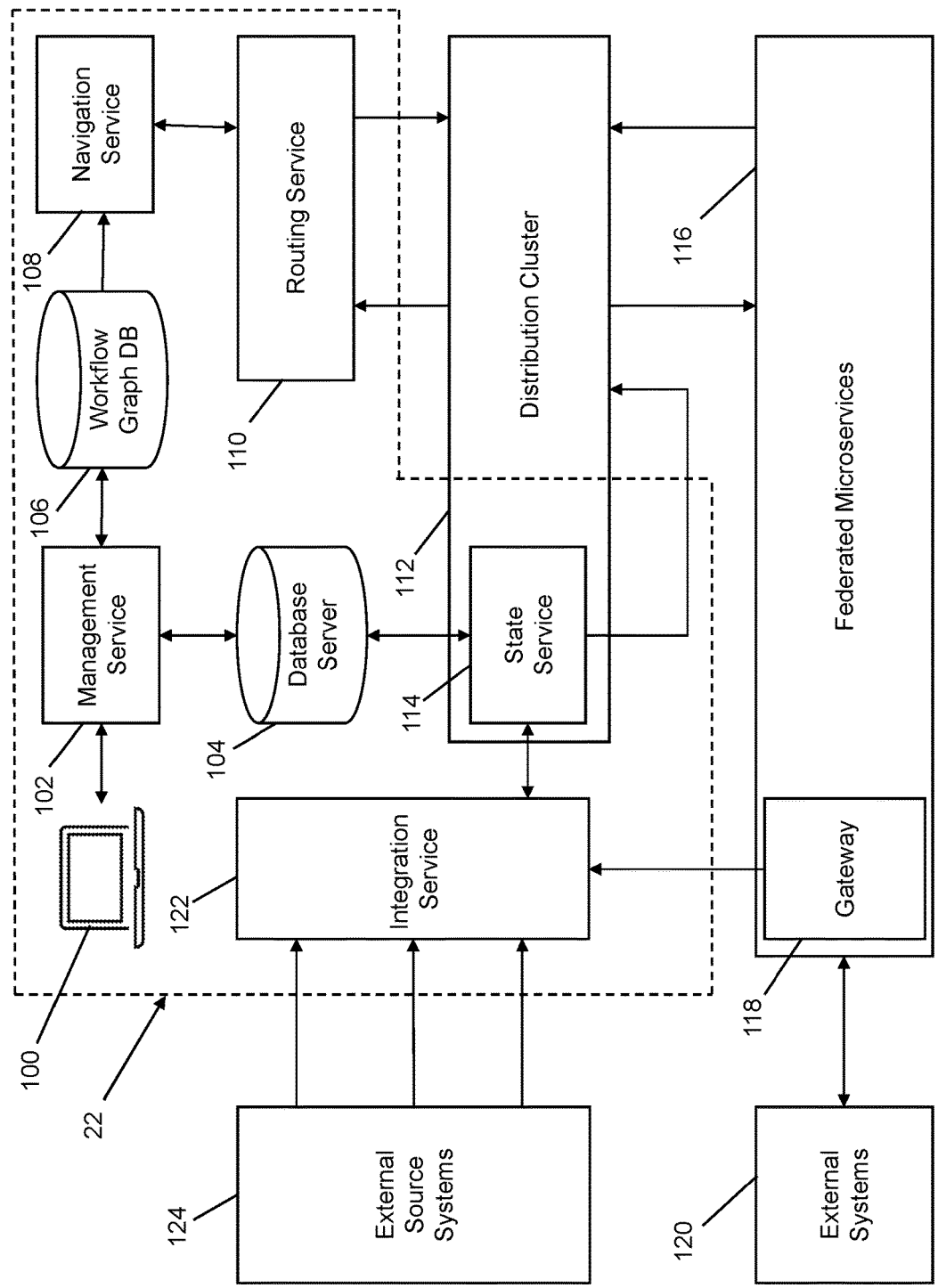
FIG. 5 is a block diagram of an example configuration of a business process platform deployed in a computing environment.

Referring now to FIG. 5, a block diagram illustrating an example of a configuration for the business process platform 22 is shown. The business process platform 22 is configured to visualize, define, and implement a business process as a graph. The platform 22 enables dynamic routing and functional declarations for application onboarding. The platform 22 also provides a standard integration mechanism to facilitate a federated build of the processes using a microservice layer. Message persistence can occur in a queue and graph database for recovery. The UI functionality, described in greater detail below, allows for a low- or no-code implementation of the process from building blocks available to the platform 22. This also enables the platform 22 to be integrated with process automation tools.

The platform 22 in the configuration shown in FIG. 5 includes a workflow manager 100 that uses a management service 102 to determine and display currently executing workflows as well as to define workflows as a graph. The management service 102 is connected to a workflow database 106. An example of an implementation for the workflow graph database 106 can include a Neo4j database, which is considered to be efficient in querying complex graphs. The workflow graph database 106 can unlock value from data relationships to facilitate the creation of electronic products and services and/or to enhance existing electronic products and services. In comparison to a relational database, a graph database 106 can model and store data and relationships with less complexity and can avoid the need to redesign schema when new types of data and/or relationships are added. These attributes make the use of a graph database 106 particularly advantageous for master data management, network and IT operations, graph-based searches, identity and access management, fraud detection, recommendations and social capabilities.

The management service 102 is also configured to store the workflow graphs in such a workflow graph database 106. A navigation service 108 can load a workflow graph instance from the graph database 106, translate the graphical representation to task-based messages (as described below), and interact with a routing service 110 to determine and execute the next workflow task as also described in greater detail below. The routing service 110 queries the navigation service 108 for the next workflow task according to the graph. The routing service 110 also interfaces with a distribution cluster 112 to egress or ingress a topic and coordinate with one or more federated microservices 116.

The distribution cluster 112 can also use the routing service 110 to subscribe to ingress the topic for the current task such that the routing service 110 receives a document for the current task. Here, the state of the workflow is given by the topic position. The routing service 110 also updates the document and publishes a workflow state change egress topic for the current task, e.g., by attaching a dynamic routing header.

The distribution cluster 112 includes or otherwise accesses a state service 114 (e.g., using Pulsar functionality) to map the external ingress to internal ingress topics as well as to map the internal egress to external egress topics. The state service 114 also validates and logs the published document and the workflow state change in a database server 104 that is accessed by the management service 102 to display the currently executing workflow as noted above.

The distribution cluster 112 is coupled to a set of federated microservices 116 to provide the flexibility of onboarding functional microservices for extensions. For example, web publication, time series tools, and real-time monitoring can be onboarded. These microservices 116 can also be leveraged in other workflows, providing modularity to an organization that employs the system across a number of business workflows. The distribution cluster 112 interacts with the federated microservices 116 to enable a client to subscribe to egress a topic. The client can also post from the federated microservices 116 to the distribution cluster 112 to ingress a topic.

Examples of such microservices that can be utilized by a financial institution include, without limitation: payments, money transfer generation, wire enrichment, credit/liquidity service, fraud/anti-money laundering, accounting service, limits management, supplemental income routing service, business rules and reference management, approval service, alerts/email service, reconciliation service (matching), and document generation.

The federated microservices 116 can include a gateway 118 to communicate with external systems 120 as needed as well as to communicate with an integration service 122 in the platform 22. The integration services 122 can communicate with external source systems 124 such as external web services, drop copy services and external databases to allow external systems to publish documents. Similarly, the integration service 122 can pick up data from a files dropped to a drop copy service or from a database.

Figure 6:
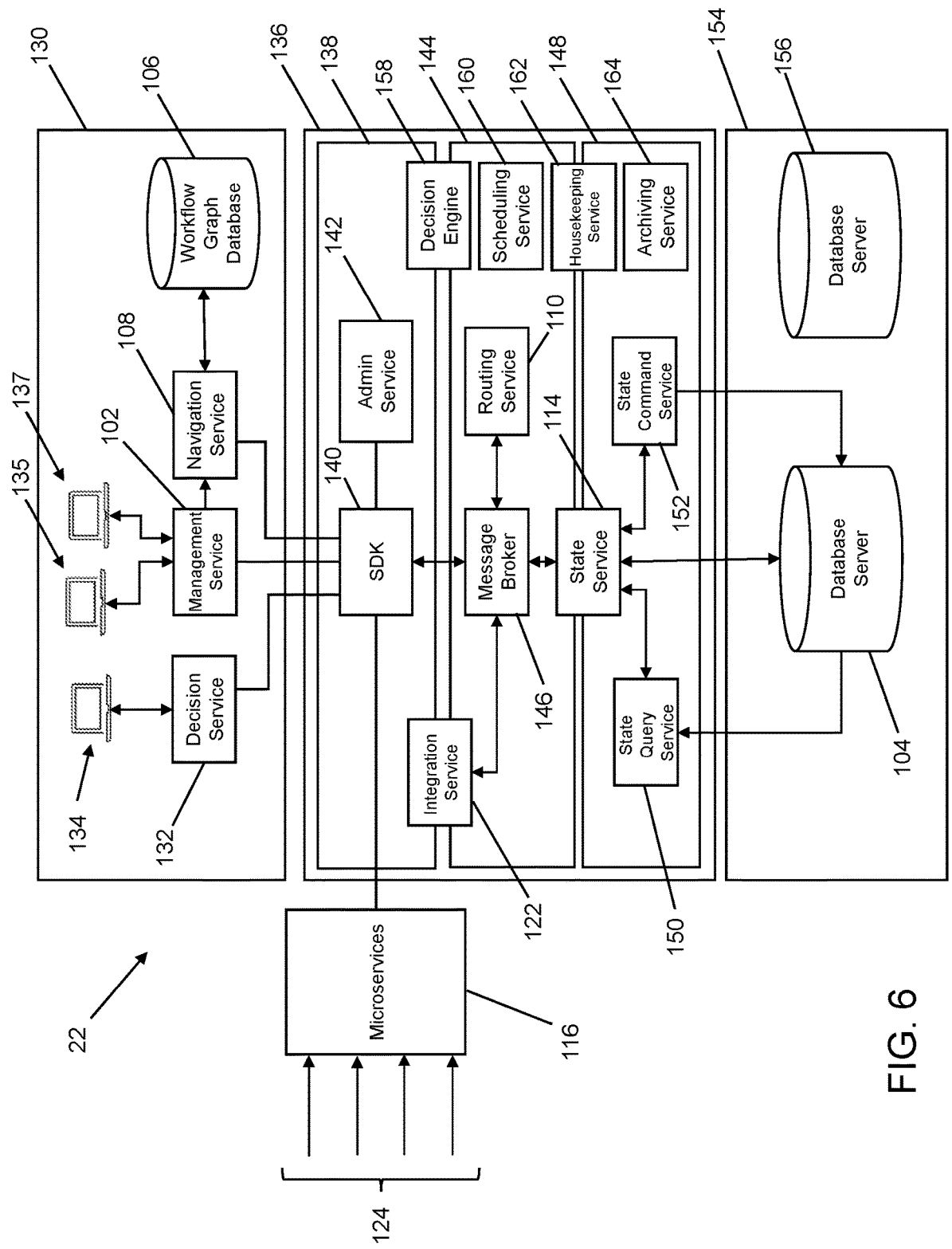
FIG. 6 is a block diagram of an example of a technology stack for implementing the business process platform.

Referring now to FIG. 6, a technology stack for implementing the business process platform 22 is shown. In this example configuration, a workflow orchestration layer 130 is positioned on an integration and distribution layer 136, which is positioned on a persistence layer 154 to implement the architecture shown in FIGS. 4 and 5. It can be appreciated that only certain modules, applications, services tools, and engines are shown in FIGS. 4-6 for ease of illustration and various other components would be provided and utilized by the business process platform 22 including, without limitation, servers, devices, processors, communication modules, communication buses, and computer readable media as defined above. The workflow orchestration layer 130 includes one or more servers to provide the management service 102, the navigation service 108, the workflow graph database 106 coupled to the navigation service 108, and a decision service 132. The decision service 132 is provided as an interface with a decision client 134, for example, a user that interfaces with the business process platform 22 to execute a task such as an approval. The management service 102 can interface with a designer client 135 to enable process workflows to be created as herein described, as well as other clients 137 to provide dashboards and other data and information to certain users such as administrators, developers, testers, employees, etc.

The decision service 132, management service 102 and navigation service 108 communicate with the integration and distribution layer 136 by connecting to an integration sub-layer 138 via a software development kit (SDK) 140 that permits external microservices 116 to be integrated into a process workflow as described in greater detail later. The external microservices 116 can include REST API, database, connector, and file share services from external source services 124, for example. The SDK 140 is coupled to an admin service 142 at the integration sub-layer 138 to enable administrator access to the SDK 140 and microservices 116.

The integration and distribution layer 136 also includes a routing sub-layer 144. The routing sub-layer 144 provides a messaging and routing platform using a message broker 146 such as RabbitMQ, which subscribes to the integration sub-layer 138 via the SDK 140. The message broker 146 is coupled to the routing service 110 to execute task-based routing as described in greater detail later. The message broker 146 is also coupled to the integration service 122, which bridges the integration and routing sub-layers 138, 144. For performance efficiency, the message broker 146 can be stateless in which case messages handled by the message broker 146 in conjunction with the routing service 110 and the state of the workflow are not stored in the routing sub-layer 144. To provide persistence for the messages, the message broker 146 is coupled to a state service 114 in a persistence sub-layer 148. The state service 114 can adopt bitemporal modeling in order to handle historical data along two different timelines to make it possible to "rewind" the information to as it actually was in combination with as it was recorded at some point in time. This enhances process workflows that circle back to previous tasks and previous states to ensure that the data being reprocessed has the history as it was "as-of" that time.

For additional performance considerations, including a high volume of messaging over the platform 22, the state service 114 can utilize a state query service 150 to write data to the database server 104 in the persistence infrastructure 154. As shown in FIG. 6, the persistence architecture 154 can include additional database servers 156 in a clustered configuration along with the database server 104. The state service 114 in this example utilizes a separate state command 152 to handle write operations to the database server 104. The database server 104 in this example can include a relational database technology such as a SQL server to store the data according to the bitemporal modeling and persistence described herein.

As shown in FIG. 6, additional services can be provided to bridge the sub-layers in the integration and distribution layer 136, such as a decision engine 158, a scheduling service 160, a housekeeping service 162, and an archiving service 164 for performing their namesake operations and services.

Figure 7:
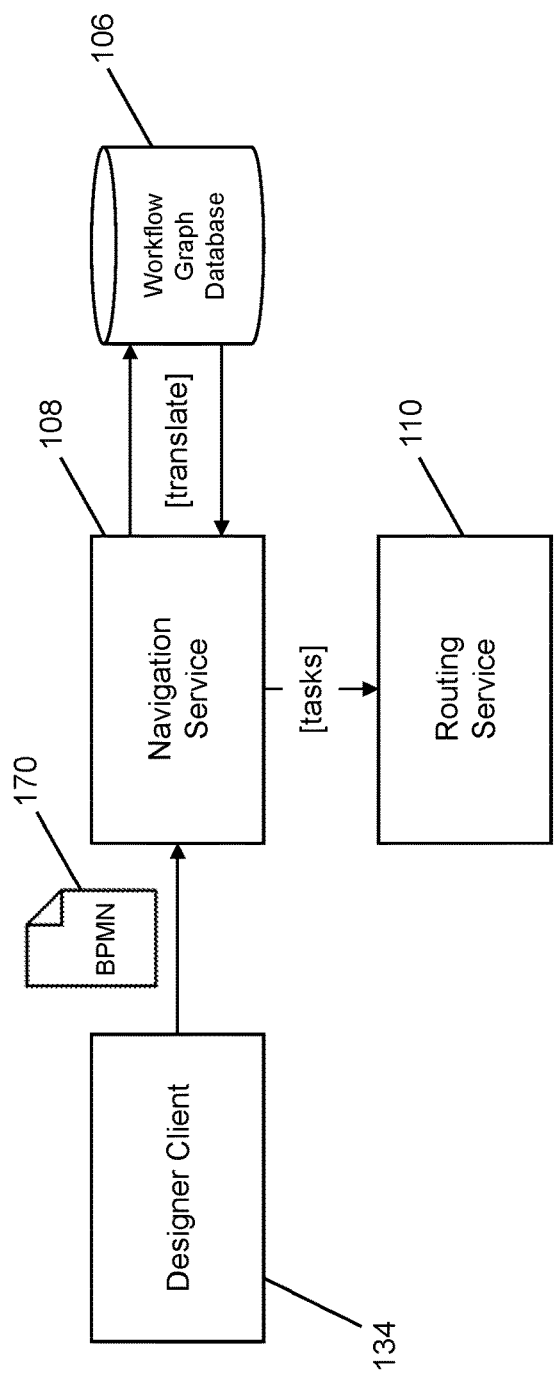
FIG. 7 is a flow diagram illustrating the translation of a workflow graph to tasks for a routing service.

The navigation service 108 and the routing service 110 operate using the underlying message broker 146 to perform task-based messaging and routing on the business process platform 22 to implement a process workflow that is based on the process workflow being designed and stored as a graph. Referring to FIG. 7, the navigation service 108 acts as a translation layer for the routing service 110 by loading a business process model notation (BPMN) payload 170 created by a user via the designer client 134. BPMN is an exemplary graphical representation for specifying business processes in a business process model. This provides a familiar and intuitive way for users to create a process workflow for a business process in a flexible and extensible manner. The graph-based workflow also permits the state of a workflow to be inferred from the topic and does not require the state to be actively stored and updated. This, in combination with the bitemporal storage of the messages handled by the message broker 146, provides a stateless execution while storing data as it changes over time. The navigation service 108 stores the BPMN payload 170 in the workflow graph database 106 and, when executing the corresponding workflow, retrieves the stored graph and translates the graph structure to a data interchange format such as JavaScript Object Notation (JSON) in order to determine tasks to be consumed by the routing service 110. This translation can be performed by the navigation service 108 pattern matching the graph to predefined patterns to generate the task, which are then consumed by the routing service 110 for dynamic routing. Example types of tasks can include, without limitation, point-to-point, intake, multicast/recipient list, aggregator, decision service 132, binary decision, script task, service task, custom send tasks (e.g., email), etc.

Figure 9:
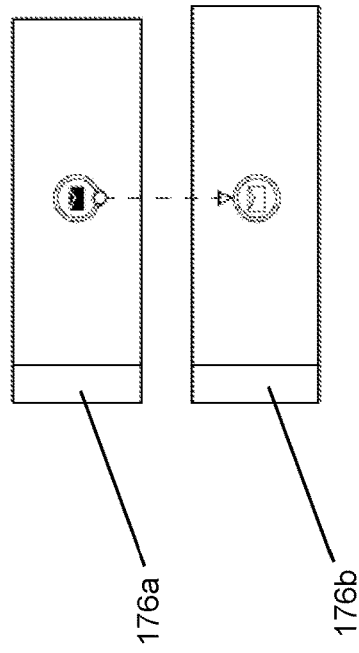
Figure 8:
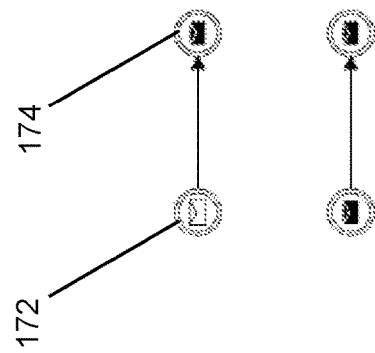

FIGS. 8 through 20 illustrate various tasks that can be implemented by the routing service 110 and message broker 146. FIG. 8 illustrates internal point-to-point tasks which include copying a message from topic A to topic B within a process. The source 172 should be one of a start message event, an intermediate catch message event, or an intermediate throw message event. The target 174 in this case should be one of an intermediate throw event and an end message event. FIG. 9 illustrates an external point-to-point task which copies a message from topic A to topic B across two processes 176a, 176b. FIG. 10 illustrates a multicast task which copies (i.e., broadcasts) a message from one topic to multiple topics using a multicast operator 178. For example, the routing sub-layer 144 can contain a BPMN parallel gateway that immediately follows an intermediate catch message event and immediately precedes intermediate throw message events. FIG. 11 illustrates an internal aggregator task to merge parallel gats from a multicast process using an aggregator operator 179. To implement an aggregator task the routing sub-layer 144 can contain a parallel gateway that connects intermediate throw message events, immediately followed by one intermediate throw message event. The aggregator task can await the arrival of message events feeding the parallel gateway. Several options can be implemented for merging including, for example, first one wins, last one wins, first non-null wins, last non-null wins, among other custom routines.

Referring to FIG. 12 an intake or external aggregator task is shown. For intake tasks, a new document ID is generated, and the intake task sets the schema for the whole process that follows from what is provided at the intake. For example, the routing sub-layer 144 can contain a BPMN receive task that immediately follows a start message event and immediately precedes an intermediate throw message event, wherein the number of tasks publishing to the message channel is equal to one. The graphical element 180 shown in FIG. 12 can also represent an external aggregator that merges parallel processes, e.g., across BPMN files. While topologically equivalent to the intake task, the number of tasks publishing to the message channel would be greater than one for the external aggregator task.

FIG. 13 illustrates a decision client task that enables a specialized task 182 to be defined that relies on a manual decision 184 from a user through the decision client 134 (interfaced to the decision service 132). For example, the routing sub-layer 144 can contain a BPMN user task that immediately follows an intermediate message event (throw or catch), immediately precedes an XOR gateway that immediately precedes message throw events (intermediate or end). FIG. 14 illustrates another type of decision client that includes a timer boundary event 186 (interrupting or non-interrupting) that can be associated with a service level agreement (SLA), for example. The interrupting timer on a decision service 132 deactivates the XOR gateway and enables the alternative path (e.g., for an escalation) as shown in FIG. 15, and the non-interrupting timer on the decision service 132 keeps the XOR gateway activated as shown in FIG. 16 (e.g., for initiating a reminder).

A binary decision task is shown in FIG. 17, which is a specialized task 192 that relies on an expression (e.g., JSON path expression) that evaluates to a Boolean decision, e.g., the true and false branches shown in FIG. 17. The routing sub-layer 144 can contain a BPMN business rule task that immediately follows an intermediate message event (throw or catch), immediately precedes an XOR gateway that immediately precedes two message through events (intermediate or end) that connects to a true-false condition from the XOR gateway. The BPMN business rule task can also evaluate an expression such as a JSON path expression, e.g., "@.distribution=~/^.*FundSERV.*$/". A script task 194 is shown in FIG. 18, which is a task that evaluates expressions inline. The routing sub-layer 144 can contain BPMN script task that immediately follows an intermediate message event (throw or catch) and immediately precedes a message throw event (intermediate or end). The script task 194 can support various formats, such as ES6/ECMAScript 2015 or Python™.

FIG. 19 illustrates a service task 196, which is a task that integrates with an external microservice 116. The routing sub-layer 144 can contain a BPMN service task that immediately follows an intermediate message event (throw or catch) and immediately precedes a message throw event (intermediate or end). The service task 196 contains a named service configuration that contains the information on the tenant, input parameters, return values, and input and output topics that are permissioned for the tenant. For example, the service configuration can be assigned to an implementation tag of the service task as: service:<SERVICE_CONFIG_NAME>.

Custom send tasks can also be utilized, which are specialized send tasks with a custom implementation that can follow a pattern such as: <customTaskType>:<CUSTOM_TASK_CONFIG>.

Referring now to FIG. 20, a sub-process task 198 is shown. A sub-process task 198 is a task that invokes another subprocess. The routing sub-layer 144 can contain a BPMN call activity that immediately follows an intermediate message catch event, and immediately precedes an event-based gateway that catches messages from the sub-process. The call activity can also dictate that the messages should correspond to end message events in the sub-process.

Figure 21A:
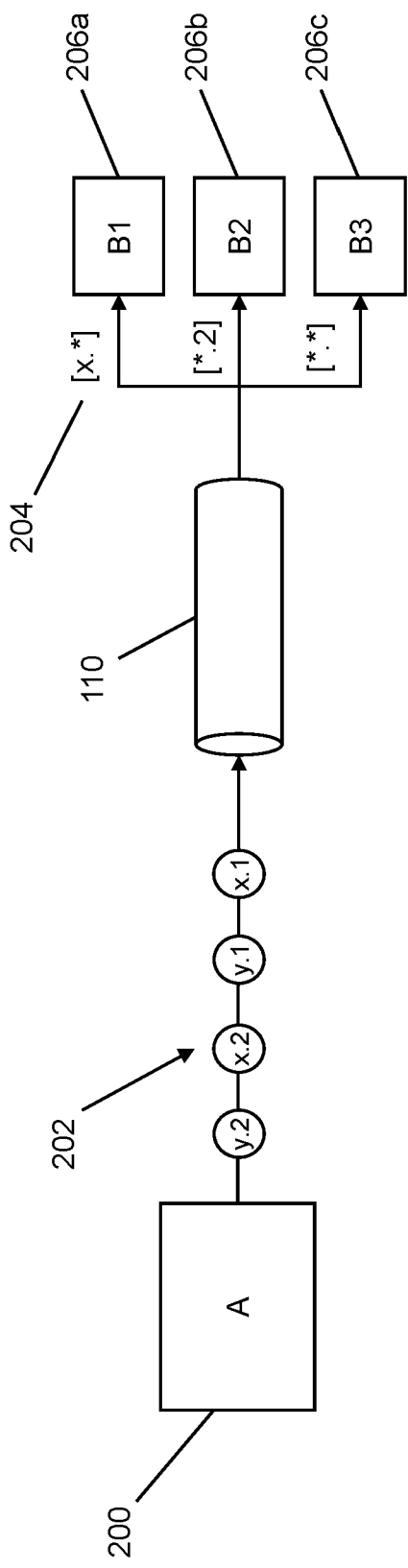
FIGS. 21a and 21b are flow diagrams illustrating message flows according to subscriptions made by processes.
Figure 21B:
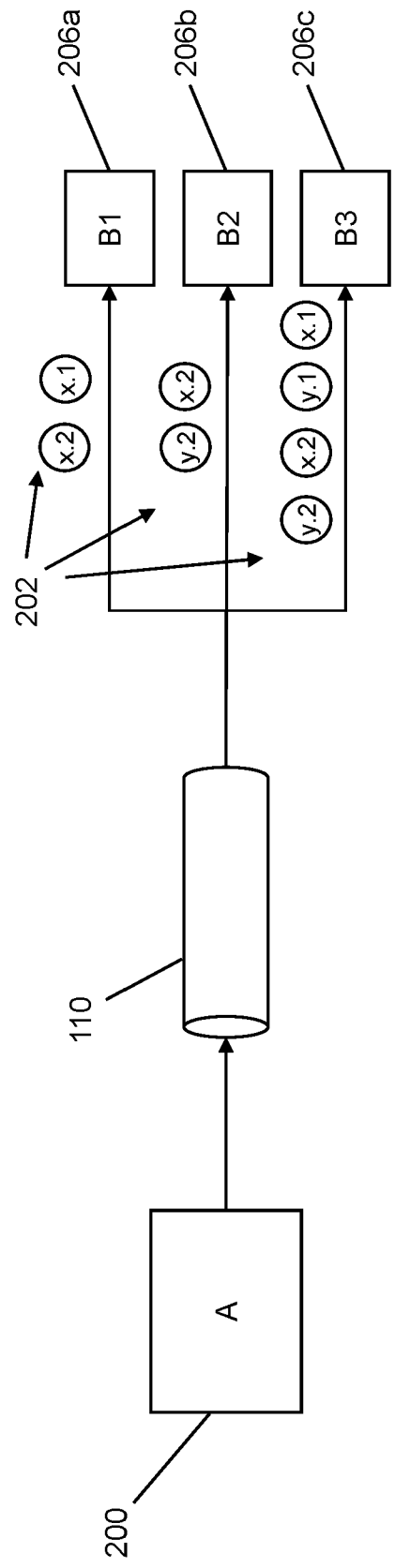

As discussed above, processes or tasks or services can subscribe to a named destination by implementing a publish-subscribe messaging protocol. For example, Process A can publish a message that is sent to processes that subscribe to that message, e.g., where Process $B_n$ each receives the same message. FIGS. 21a and 21b illustrate a selective subscription protocol in which each Process $B_n$ subscribes to certain messages using wildcards. Referring first to FIG. 21a, a first process (A) 200 sends messages 202 over one or more messaging channels via the routing service 110 to multiple second processes (B1, B2, B3) 206a-206c. In this example, process B1 206a subscribes using the wildcard [x.*] such that it will receive all "x" messages. Process B2 206b subscribes using the wildcard [*.2] such that it will receive all "0.2" messages. Process B3 206c uses the all-encompassing wildcard [*.*] to receive all messages as shown in FIG. 21b.

Figure 22:
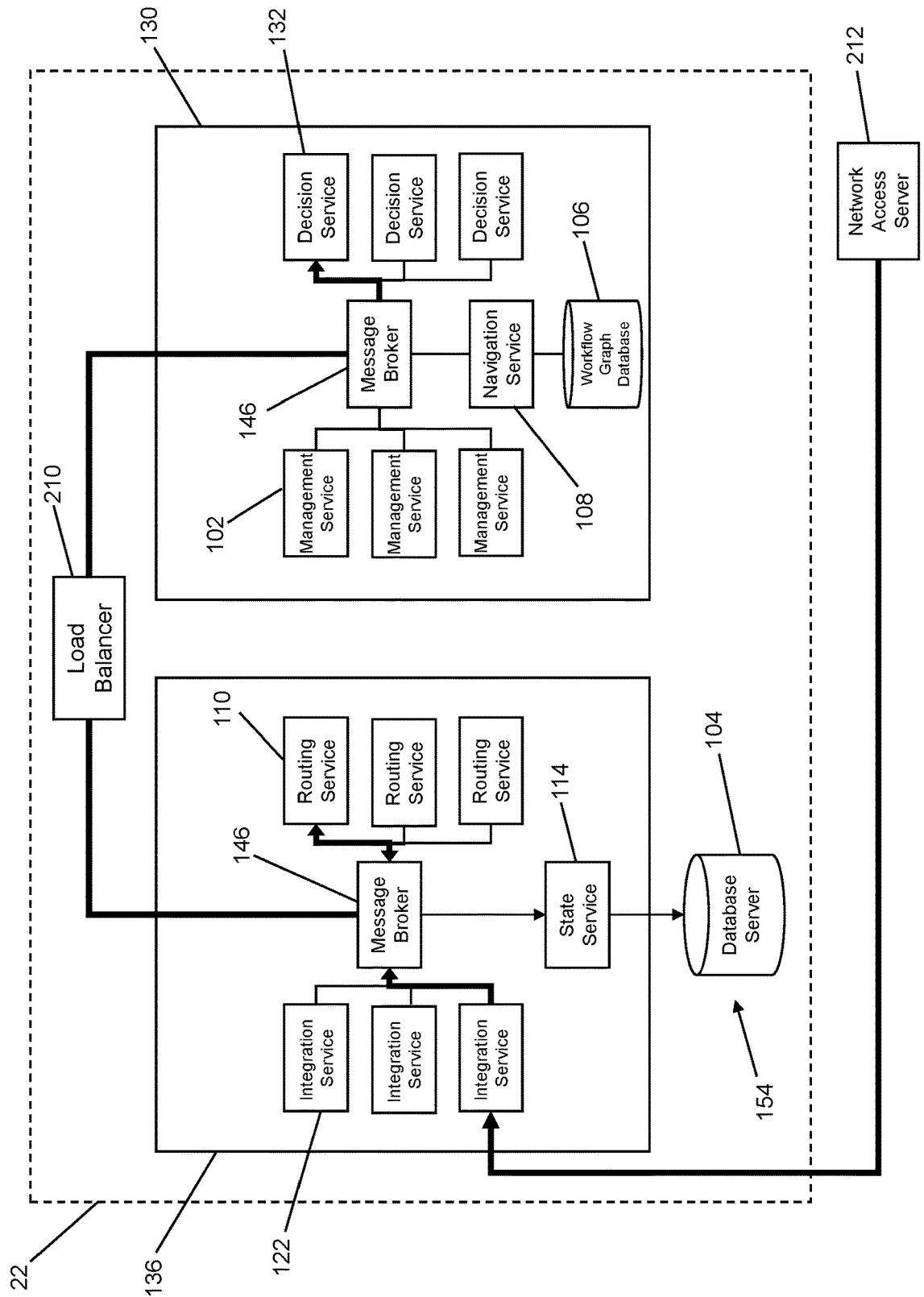
FIG. 22 is a block diagram of an example architecture configuration for implementing a routing service.

A messaging and routing architecture example is shown in FIG. 22 to illustrate the publishing of and subscribing to of topics in a process workflow. In the configuration shown in FIG. 22, the interaction between the workflow orchestration layer 130, the integration and distribution layer 136, and the persistence layer 154 is shown in a dynamic routing scenario. In this example, the business process platform 22 provides a load balancer 210 between app servers hosting the layers 130, 136. As shown using darkened lines in FIG. 22, an instance of the integration service 122 can intake a task from an external source in this example via a network access server 212. A first topic is published by the integration service 122 which is subscribed to by the routing service 110. The routing service 110 implements content-based routing to publish to a second topic, which is subscribed to in this example by the decision service 132. The message is replicated by the load balancer 210 between instances of the message broker 146 on the servers 136, 130. In this example, the decision service 132 can publish to a third topic. During this routing, the state service 114 records the messages to the database server 104 for the first, second and third topics.

Figure 23:
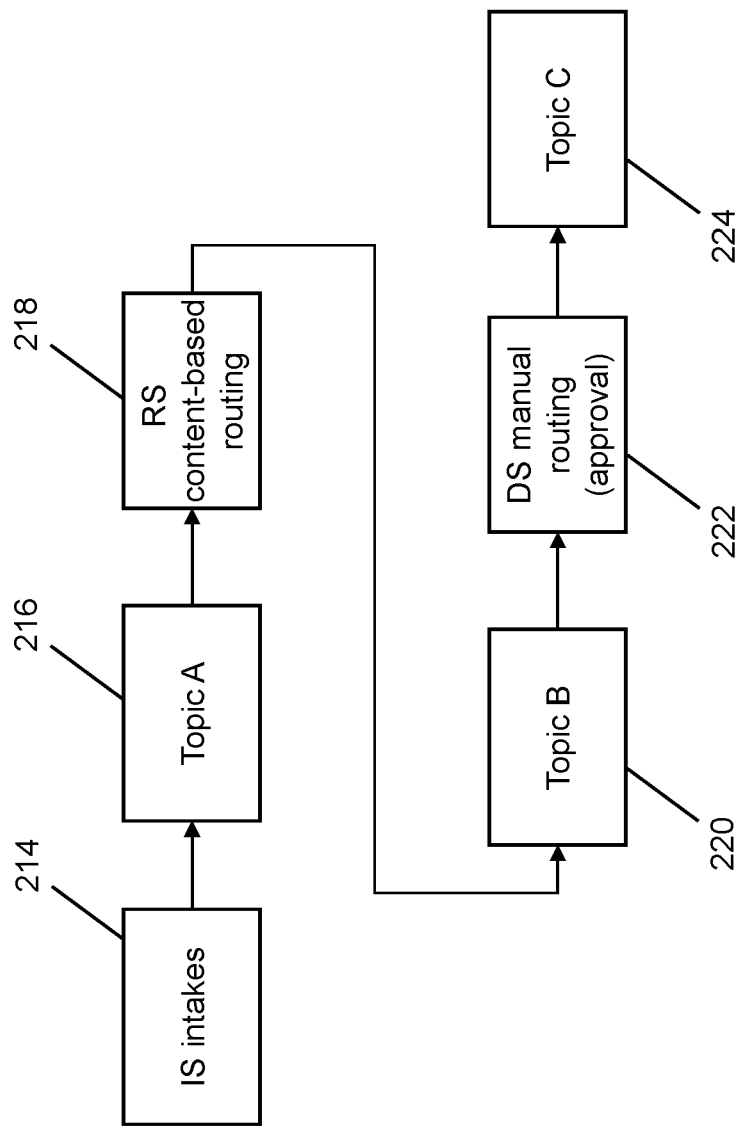
FIG. 23 is a flow diagram of a routing example using the architecture of FIG. 22.

The routing example illustrated in FIG. 22 is provided by way of a specific example in FIG. 23. In FIG. 23, at block 214 the integration service 122 intakes a document which is published to Topic A at block 216. The routing service 110 performs content-based routing at block 218, which routes the document to Topic B at block 220. Topic B in this example relies on the decision service 132 for a manual routing, for example to implement an approval at block 222, which then routes the decision outcome to Topic C, at block 224.

Figure 24:
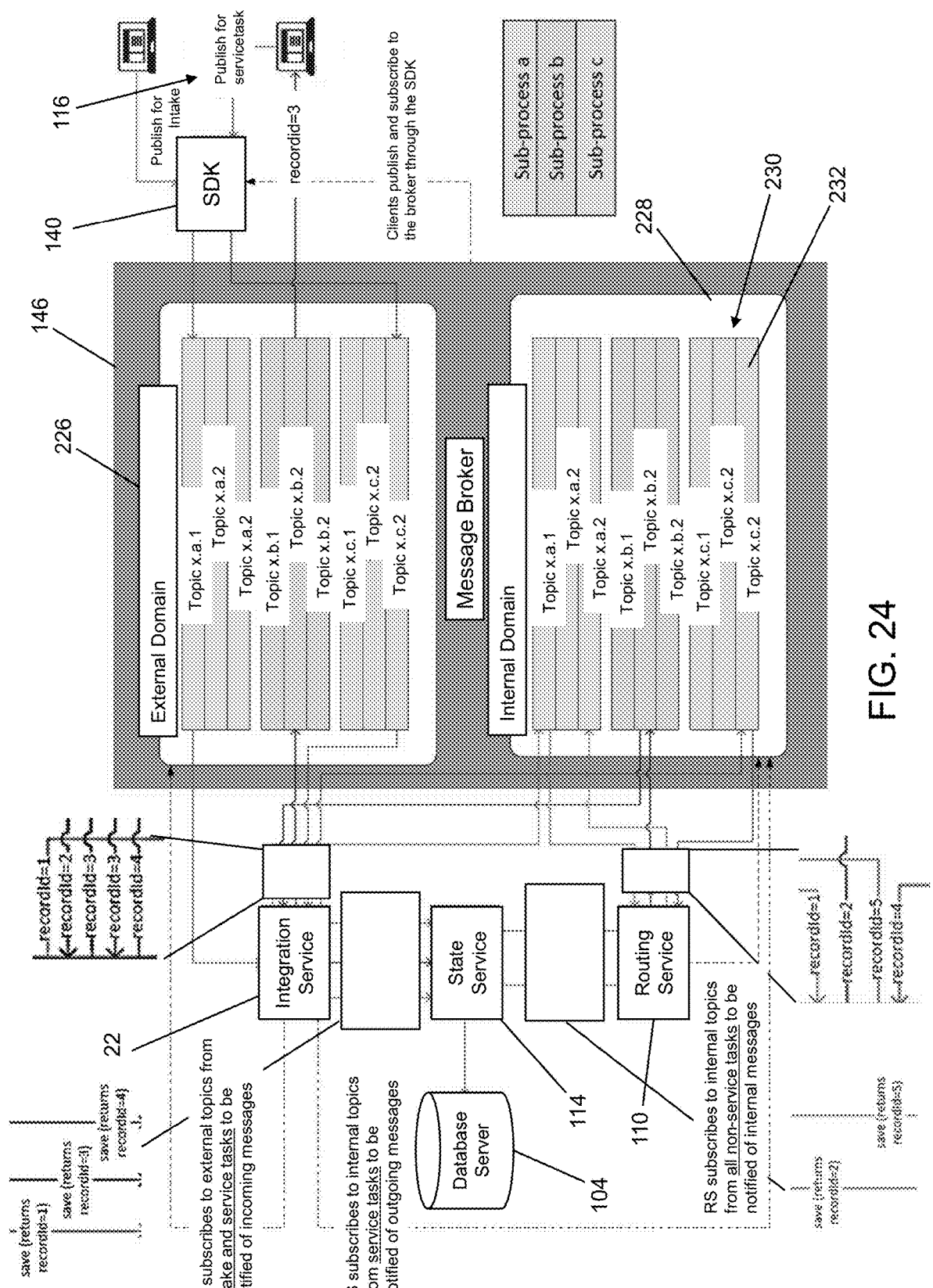
FIG. 24 is a block diagram of an example architecture configuration for implementing an integration service.

Referring now to FIG. 24, an example of a configuration for implementing data flows handled by the integration service 122 is shown. In this configuration, tenants, which are users of the system (or another system), can implement processes and topics for such processes, using notation x.a.1 for example, with x being the tenant, a being the process, and 1 being the topic. The integration service 122 is configured to interact with both an external domain 226 and an internal domain 228 within the overall domain and architecture of the message broker 146. By mapping the external domain 226 to the internal domain 228, the message broker 146 and integration service 122 can open up the business process platform 22 to external microservices 116 via the SDK 140. This allows the business process platform 22 to onboard such external microservices 116 to provide access to the data dictionary used by the application as well as the inputs and outputs that would be part of such a data dictionary. That is, the integration service 122 enables the external microservices 116 to be translated, transformed or otherwise trimmed down or reconfigured to be integrated with the platform 22.

The internal domain 228 handles internal routing while the external domain 226 handles the external routing to enable external microservices 116 to publish for intake and service tasks as well as to receive messages from the platform 22. The integration service 122 interfaces with the external domain 226 to subscribe to external topics from such intake and service tasks and to be notified of incoming messages from the microservices 116. The integration service 122 also subscribes to the internal topics from service tasks within the internal domain 228 to be notified of outgoing messages handled by the routing service 110. The routing service 110 subscribes to the internal topics from all non-service tasks to be notified of internal messages. Clients of the business process platform 22 publish and subscribe to the message broker 146 via the SDK 140. To account for the stateless routing of the platform 22, the integration service and routing service 110 are coupled to the state service 114 as illustrated in FIG. 24, to persist tasks in the database server 104.

Referring to the specific routing example shown in FIG. 24, three sub-processes are shown, namely Sub-process a, Sub-process b and Sub-process c. For the sake of illustration, each of these subprocesses includes three topics, using the notation described above, namely Topics x.a.1, x.a.2 and x.a.3 for Sub-process a, and so on for the other sub-processes. Beginning with the microservice 116 denoted by x.a, this microservice publishes for an intake task via the SDK 140 which is published at Topic x.a.1. The integration service 122 is notified of this message, saves the message to the database server 104 via the state service 114 (returns recordid=1), and notifies Topic x.a.1 in the internal domain 228 for recordid=1, and the routing service 110 is notified of recordid=1. The routing service 110 is instructed to route to Topic x.b.2 (recordid=2), which relates to service task, namely the microservice 116 denoted by x.b. The integration service 122 having subscribed to the internal topics is notified of a message to be routed to the microservice x.b by applying recordid=3 to Topic x.b.2 in the external domain 226, which is routed to microservice x.b to perform the service task.

After executing the service task, microservice x.b publishes for that service task to Topic x.c.3 in the external domain 226 via the SDK 140, such that the integration service 122 is notified of recordid=3. As with the intake task, the integration service 122 routes a message with recordid=4 to Topic x.c.3 in the internal domain 228 and saves recordid=4 to the database server 104 via the state service 114. The routing service 110 is notified of recordid=4 by having subscribed to Topic x.c.3 in the internal domain 228 and determines that an internal message recordid=5 is to be routed internally to Topic a.x.3 to complete the process flow.

Figure 25:
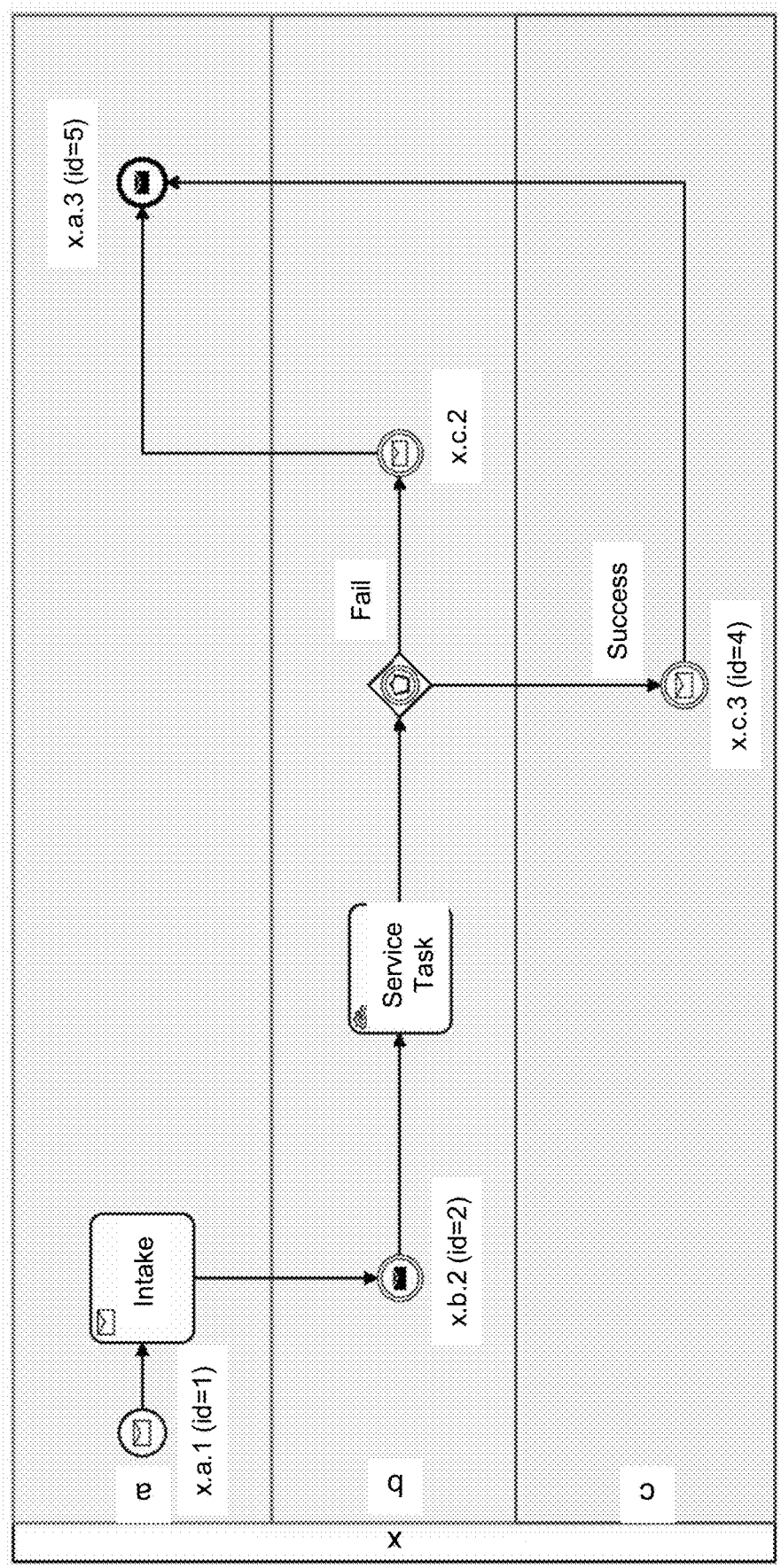
FIG. 25 is a flow diagram illustrating an example of a process workflow across multiple sub-processes.

FIG. 25 provides a graphical view of the process workflow described above in connection with FIG. 24. The three sub-processes a, b, and c are shown in parallel with the intake topic x.a.1 (id=2) routing to the intake task, which routes to the topic x.b.2 (id=2). Topic x.b.2 routes to the external service task, which leads to a FAIL or SUCCESS condition. Topic x.c.2 is shown in FIG. 25, which would correspond to the FAIL condition, but was not illustrated in this example. Instead, the SUCCESS condition was realized, which routes to Topic x.c.3 (id=4). The SUCCESS condition routes to Topic x.a.3 (id=5) as would have the FAIL condition as shown in the graphical representation. It may be noted that id=3 relates to the external routing to the microservice x.b, handled by the integration service 122 and is not noted in the platform-centric view shown in FIG. 25.

Figure 26:
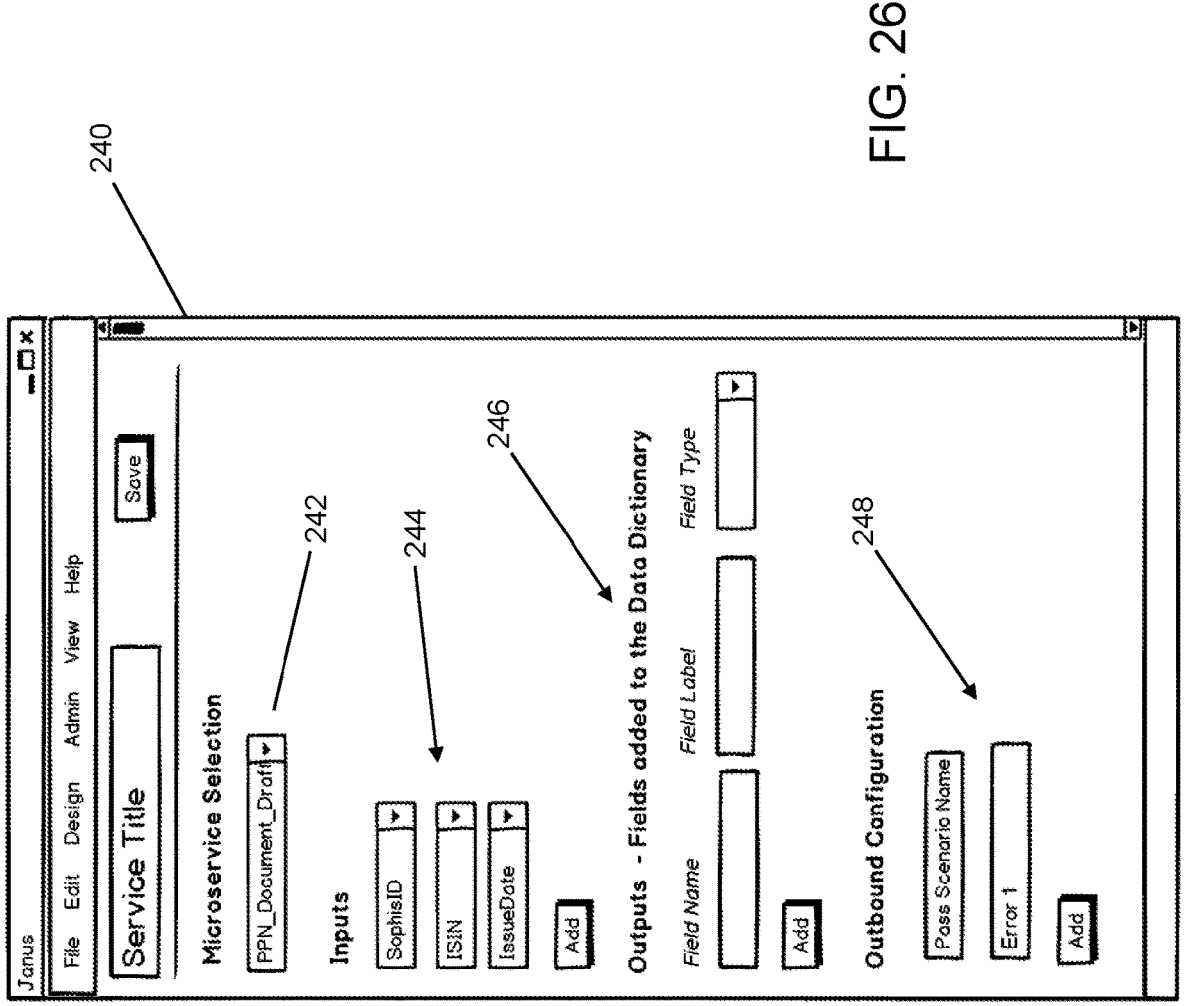
FIG. 26 is an example of a user interface for selecting an external microservice to be integrated into a process workflow by an integration service.

FIG. 26 provides a screen shot of a user interface 240 for performing a service task configuration. In this user interface 240, a microservice selection box 242 is provided along with various input selection boxes 244. An outputs definition portion 246 is also provided to enable the user to define fields that are to be added to the data dictionary for the application or process being defined. An outbound configuration entry portion 248 is also provided to enable the user to define the outbound configuration for that service task. The user interface 240 therefore can be used to integrate service tasks with the message broker 146 by providing a design tool for the business process and to onboard functionality to limit what the tenant can do with that service task.

As illustrated in FIG. 6, the state service 114 includes a state query service 150 that is separate from the state command service 152. The state query service 150 operates as a reader service to read data from the database server 104 that has been written to the database server 104 by the writer service, referred to as the state command service 152. The query service 150 assembles raw pieces of information into a coherent view of a message and/or the information contained in or represented by such message. The messages are persisted at the persistence sub-layer 148 using the state service 114, which subscribes to messages handled by the message broker 146, e.g., when routed using the routing service 110. In this way, the state of the process workflow can be determined while using efficient, stateless dynamic routing using the routing service 110. The state query service 150 can operate using "pull" semantics, such as HTTP GET or GraphQL query commands. The state query service 150 responds to read requests for objects and states and can accept temporal queries, which is possible by employing a bitemporal data model as described below.

The state command service 152, which operates as a writer service disassembles data and information persisted in the database server 104 into the raw pieces that are assembled by the reader service. The state command service 152 can operate using "push" semantics such as HTTP POST/PUT/PATCH/DELETE or GraphQL Mutation commands. The state command service 152 responds to write requests for objects and states and can write temporal data using a historized database schema as described below.

The state service 114 and persistence sub-layer 148 can employ a command query responsibility segregation model, which is the notion that a system can use a different model to update information than the model uses to read information. This can include employing bifurcated object models and bifurcated logical processes. The separation allows for targeted scaling that may be required based on read versus write workloads. The write requests can be serialized through the message broker 146 without losing data. The service pair can also be considered to provide eventual consistency on the application layer and strong consistency on the data layer. The service model described herein enables the system to create new object structures without compilation, allows object structures to be polymorphic at runtime, provides data integrity (e.g., ACID properties in SQL), provides a full normalization that removes data duplication and data anomalies, and provides support for temporal queries delivered by the underlying database engine.

The bitemporal support also allows for querying of the "quantum" properties as-of a certain time. This enables data dictionaries to evolve without violating in-flight records. The bitemporal support allows the business process platform 22 to readily track where what is used, to answer queries such as which data dictionaries use a particular field, which workflows are using a particular email template, what records have gone through a particular task, what tasks did a record go through, etc.

The service model used by the state service 114 utilizes metadata or a data dictionary to define a schema for a record as described below and can use polymorphism or dynamic typing such that different instances of the same category of objects can have different runtime properties. The service model can also provide nested custom types (e.g., embed an instrument to a trade), lists (e.g., embed observation dates for an option), and composable types (e.g., embed a cash flow schedule to a swap). The service model can also provide dynamic and contextual metadata to allow properties to have different underlying metadata (e.g., a default value can apply to some properties but not others and/or the type of the "default value" can also be with respect to the field type). By having bitemporal access to data, the state service 114 can provide information that is true "as of" a given data and time. The state service 114 can also provide information that is true at a given point in a workflow process graph stored in the workflow graph database 106 by relying on the business process platform's definition of a workflow, task and record.

Figure 27:
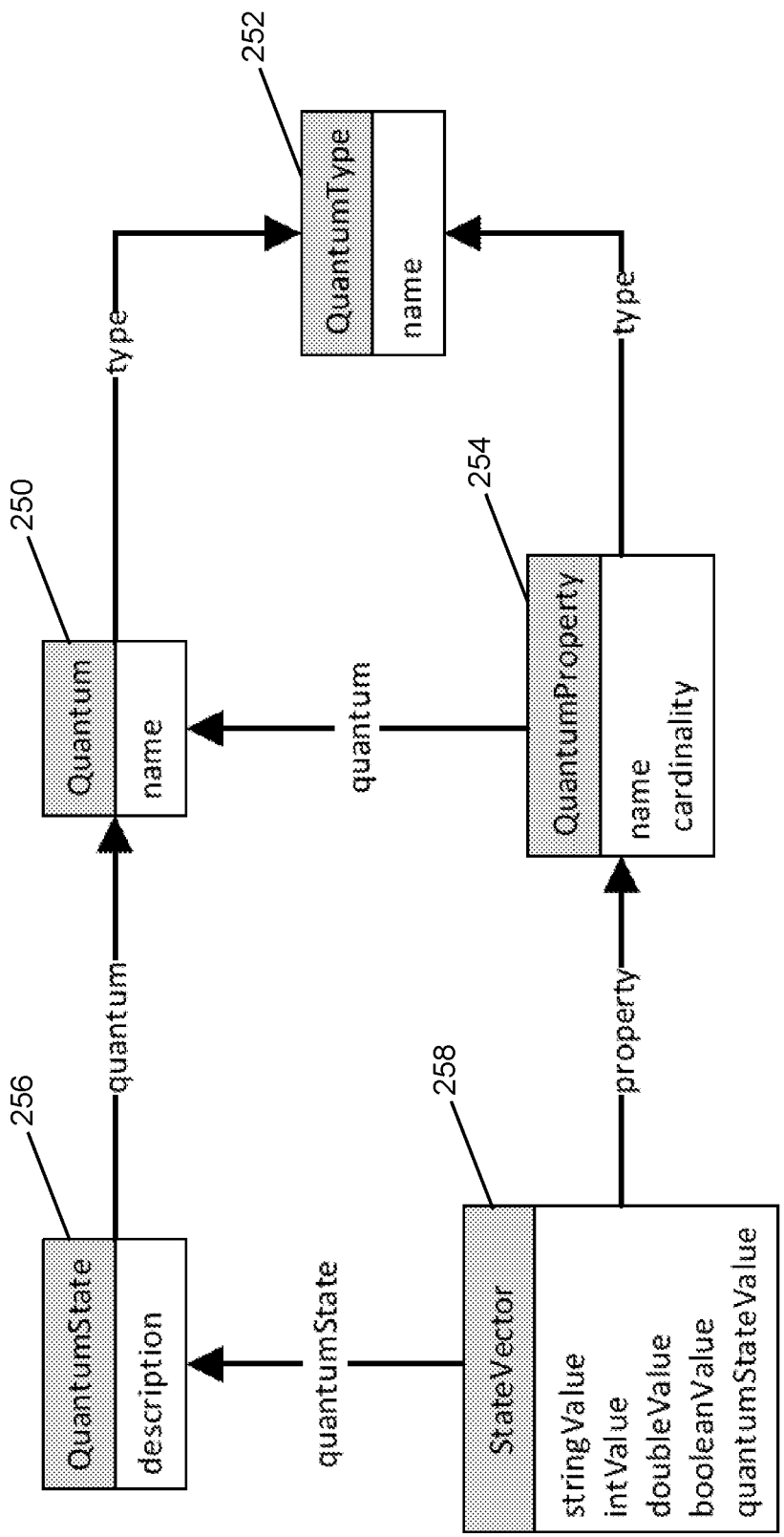
FIG. 27 illustrates a conceptual model for a database schema used to persist data by the business process platform.

Referring now to FIG. 27, the data model that can be used to define a schema for a record is illustrated. As discussed above, the data model should provide metadata or a data dictionary, polymorphism/dynamic typing, nested custom types, lists, composable types, dynamic and contextual metadata, bitemporal access to data, and provide information that is true at a given point in a workflow process graph. The data model described herein provides strong consistency, normalization, object-relational mapping, composition over inheritance, bitemporal access, separation of objects versus state, and command query response segregation as structured in the persistence sub-layer 148. The data model shown in FIG. 27 includes a quantum 250, a quantum type 252, a quantum property 254, a quantum state 256 and a state vector 258.

A quantum 250 in this data model is the object, entity or thing and is a named instantiation of a quantum type 252. A quantum 250 can be described by the characteristics that make up the object and the characteristics of its quantum type 252. Each characteristic is a quantum property 254, which is also of a quantum type 252 and defines the cardinality of values that can be assigned to it (e.g., 0, 1 . . . ). A quantum type 252 is a unique name that identifies a category of objects, such as type, field, record, data dictionary, workflow, task configuration, task, email template, service configuration, comments, etc.

The quantum state 256 is an object in observation and is created when a quantum acquires information (i.e., a quantum property gets set with a value). The acquired information is recorded in a state vector 258. A state vector 258 records the value assigned to a quantum property 254 for the quantum state 256. Such property values can either be a primitive (e.g., string/int/Boolean/double, etc.) or a quantum state reference. A quantum state 256 has a state vector 258 per quantum property 254 and multiple quantum states 256 can share the same state vector 258.

As illustrated in FIG. 27, the quantum state 256 and its description and the quantum properties and their names and cardinality point to the quantum 250. The quantum 250 points to the quantum type 252 and its name. The quantum property 254 also points to the quantum type 252. The state vector 258 points to the quantum property 254 and the quantum state 256 to provide the values associated with the quantum state description and the name and cardinality of the quantum properties 254. A quantum property 254 is typically defined at the same time a quantum 250 is created, however, a quantum property 254 can also be attached to an already defined quantum 250 at a later time. For the case of a record, a quantum property 254 can be dynamically generated by a task through the use of a field.

Figure 28:
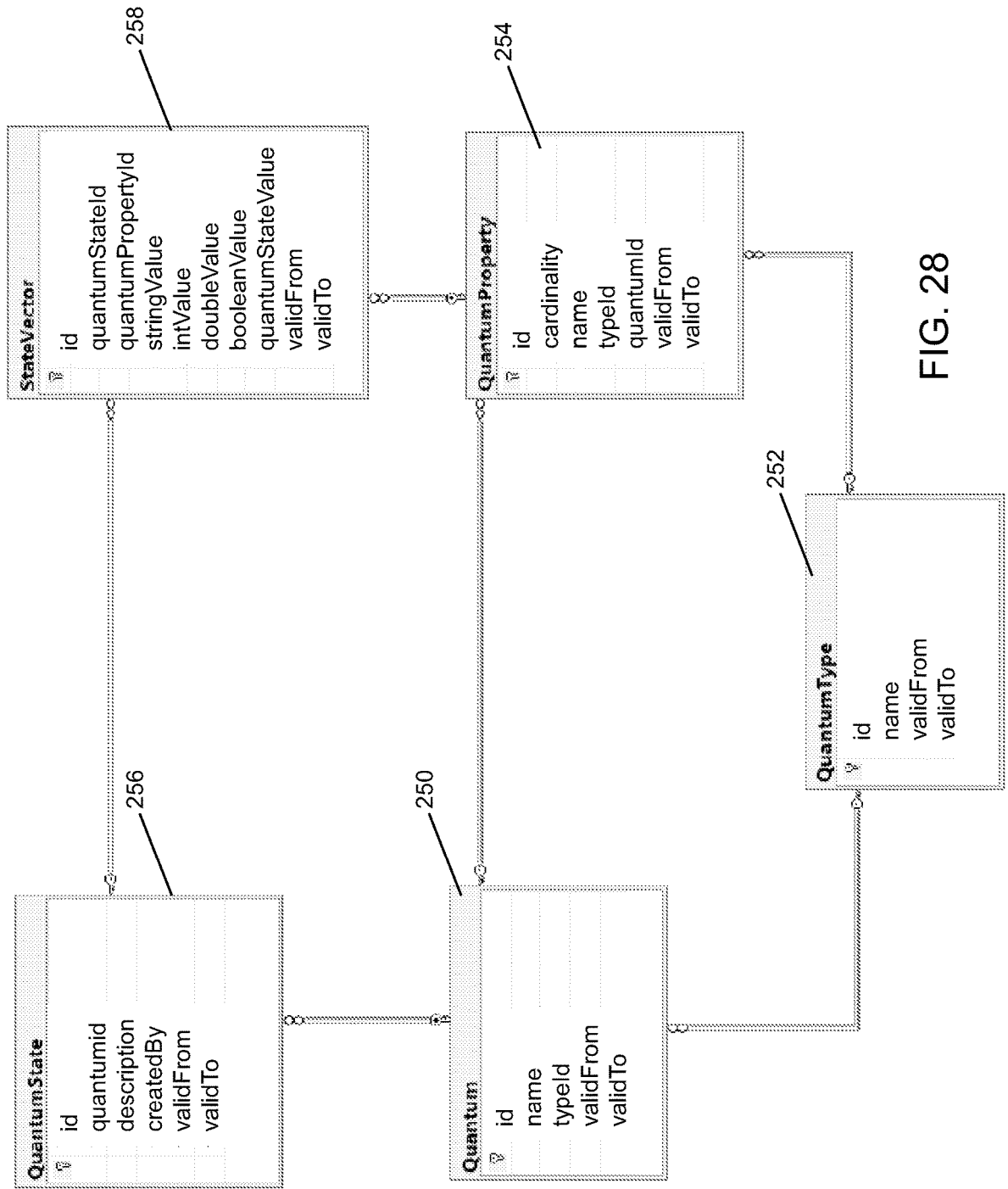
FIG. 28 illustrates a database schema for the conceptual model of FIG. 27.
Figure 29:
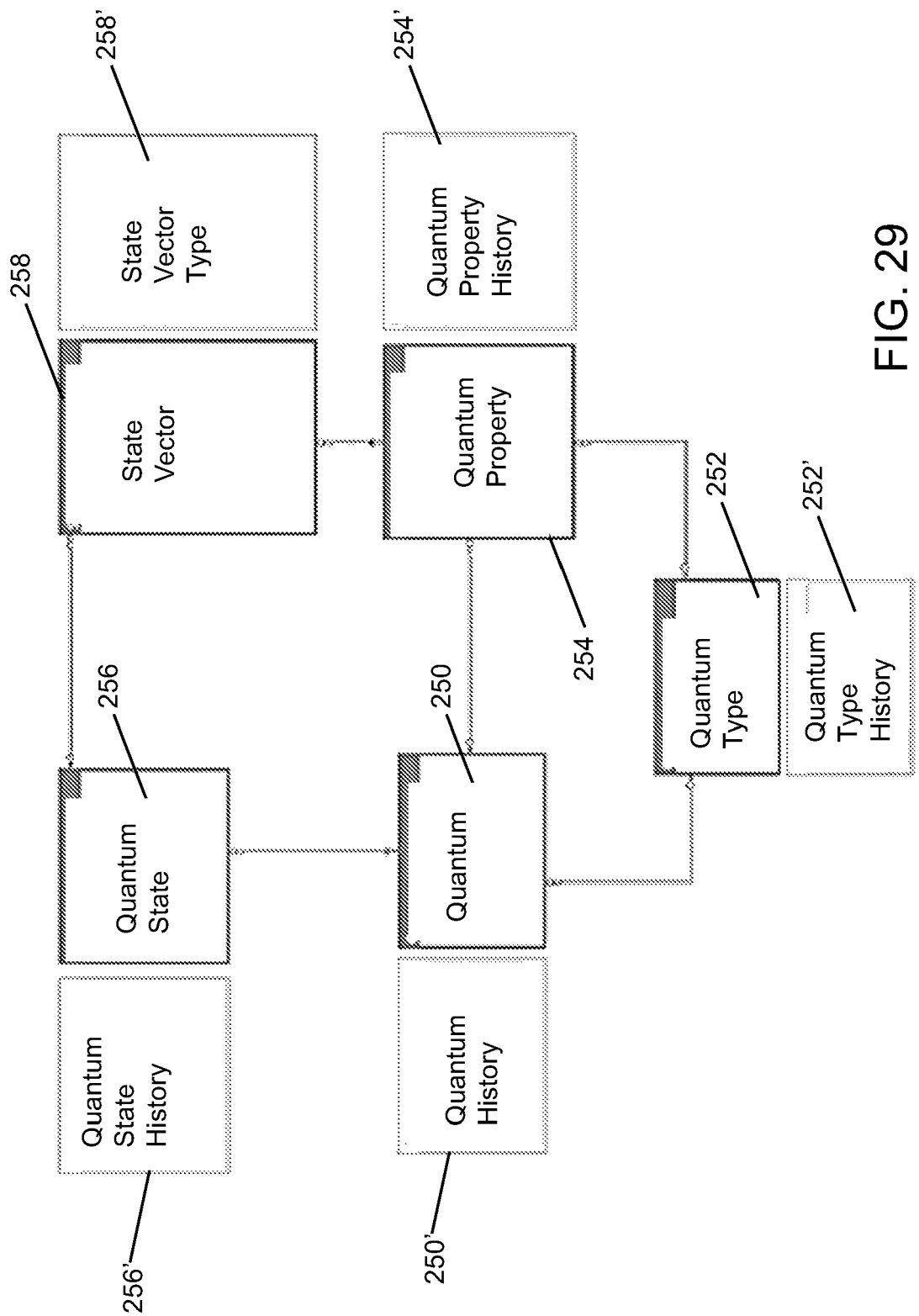
FIG. 29 illustrates the historization of the database schema of FIG. 28.

Turning to FIG. 28, the logical entities 250-258 together describe and capture all information persisted by the business process platform 22. When used as a database schema as herein described, the logical entities enable data to be historized with snapshots of the data "as of" a given date and time, thus allowing the business process platform 22 to determine information that is true at a given point in the process graph. In FIG. 29, a historized view is shown in which the logical entities 250, 252, 254, 256 and 258 have counterparts 250', 252', 254', 256' and 258' as of different points in time.

Figure 30A:
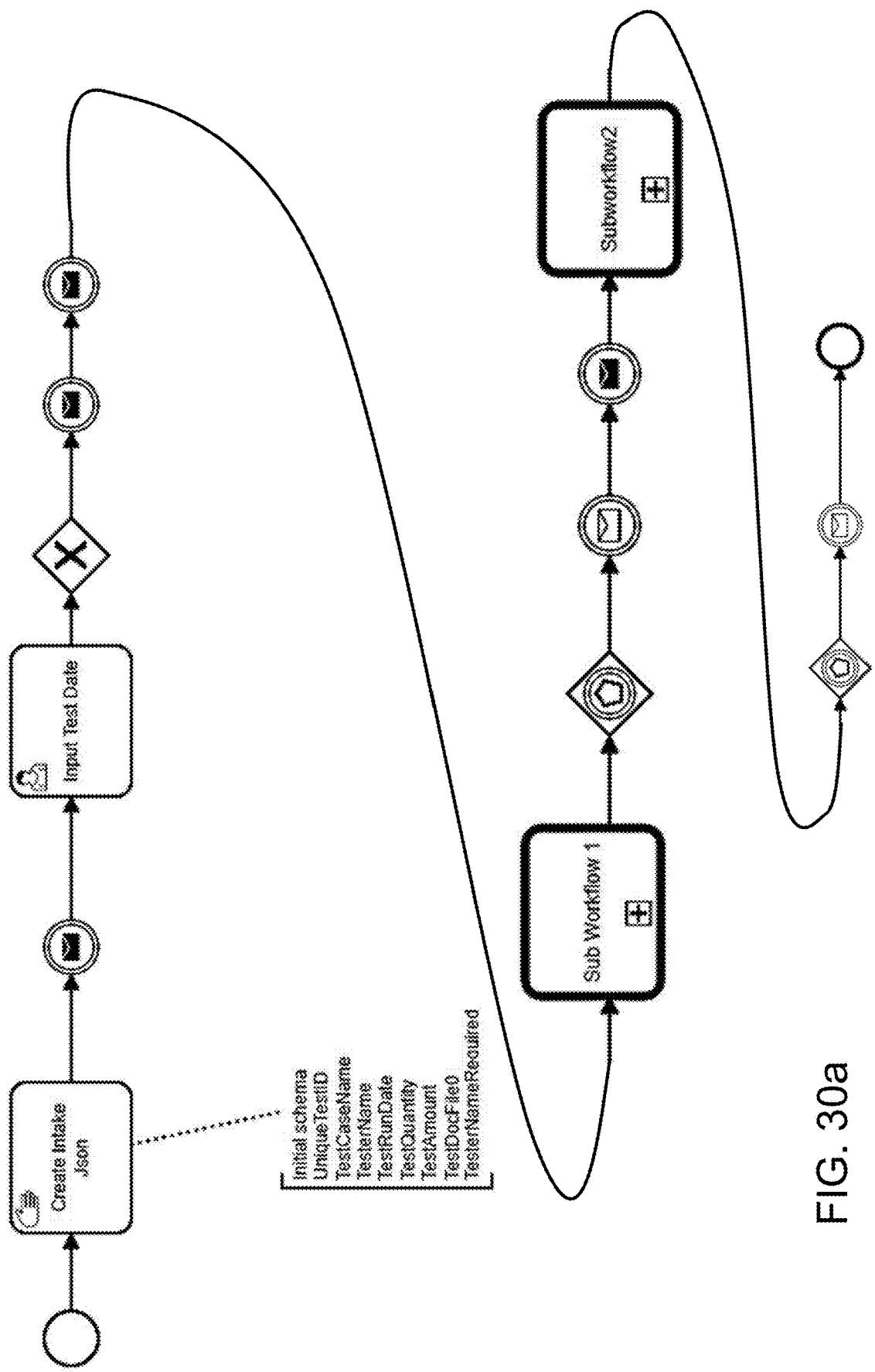
FIGS. 30a-30d are examples of business process workflows.
Figure 30B:
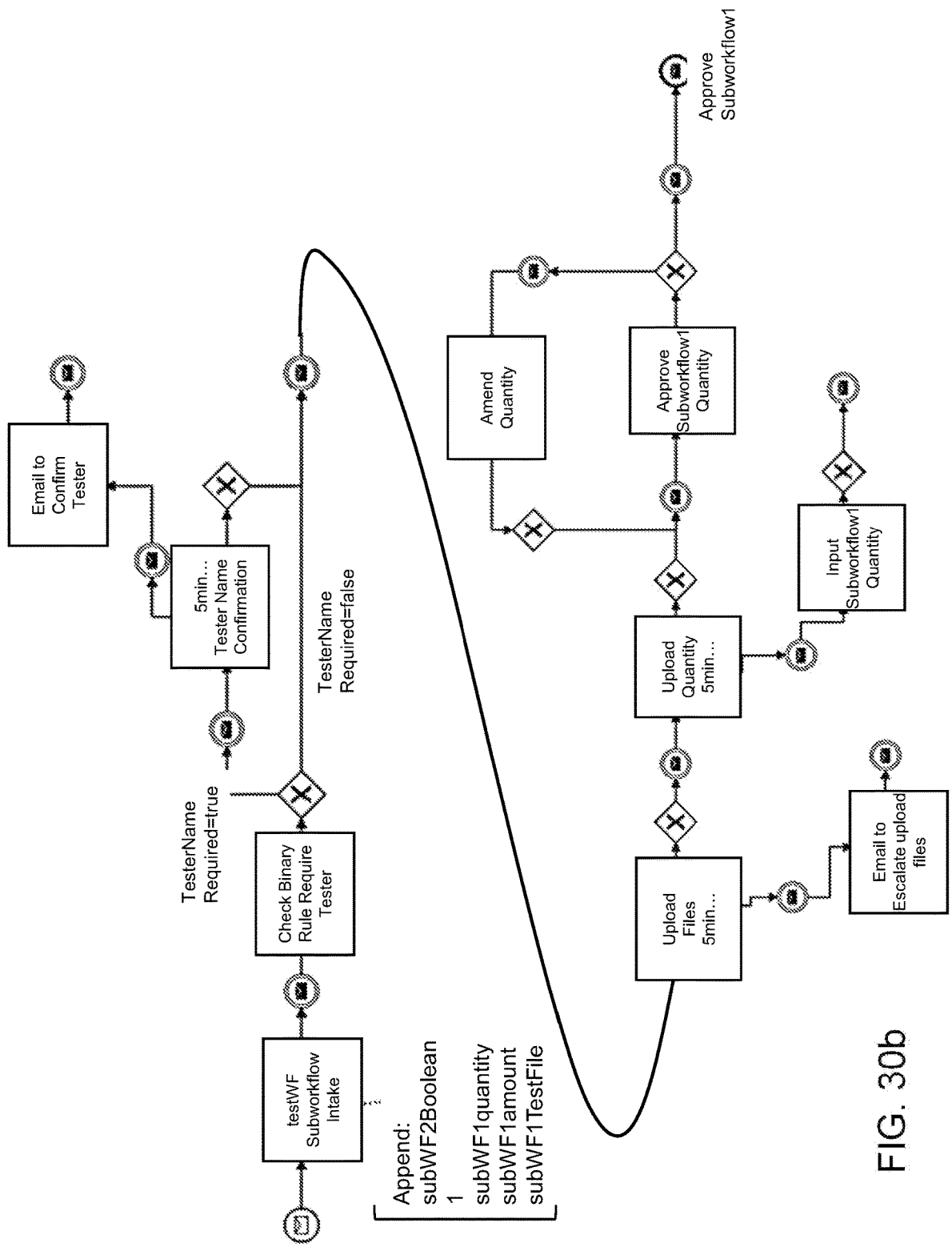
Figure 30C:
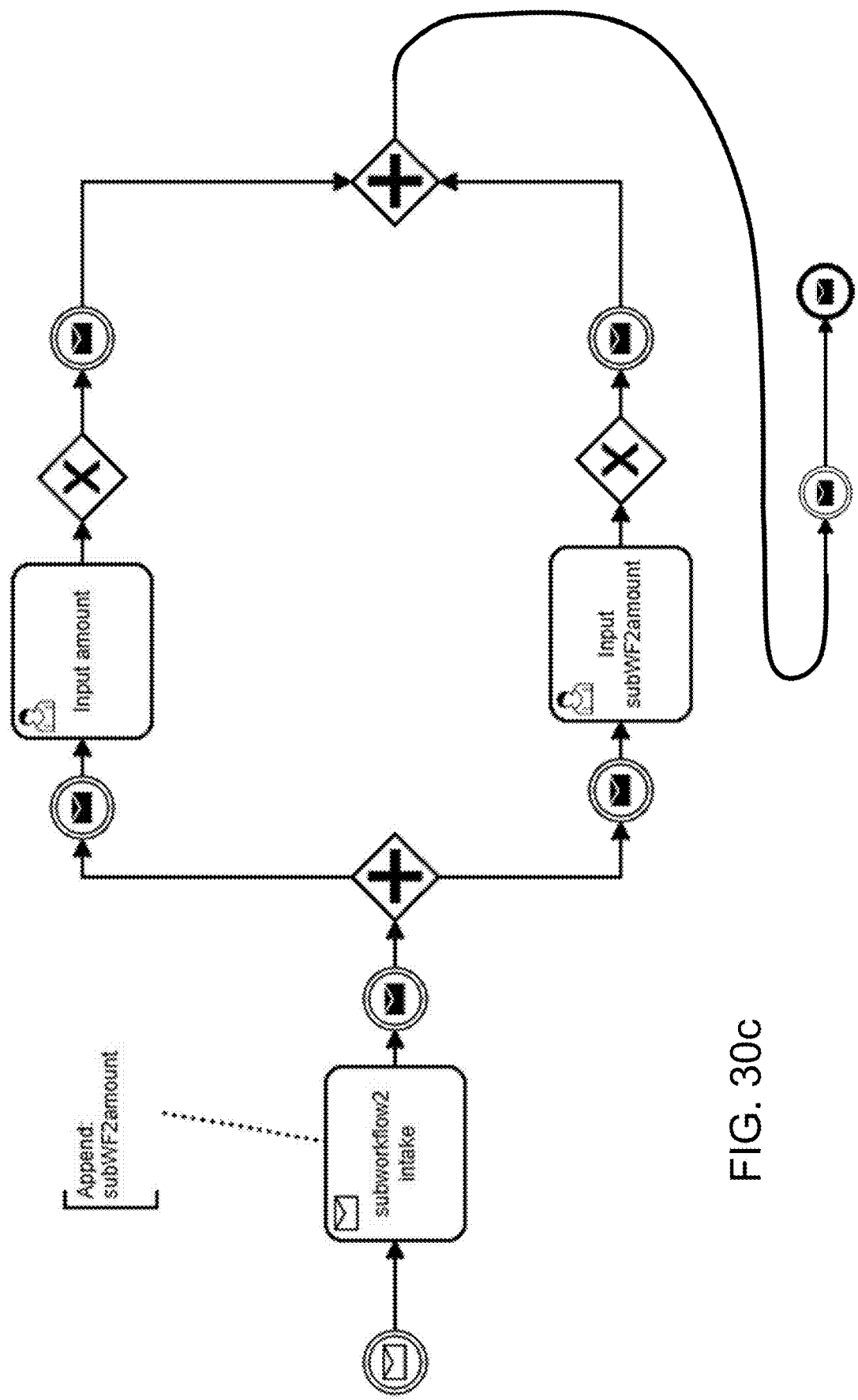

FIGS. 30a-30c illustrate a process workflow as a graph. As shown in FIG. 30a, the process includes a number of nodes that proceed through the business process and can include multiple sub-workflows that can each be constructed in a similar way. Various communication nodes are illustrated to indicate when the process passes between different parties by way of, for example, an email. The sub-workflows are shown in FIGS. 30b and 30c. Sub-workflow 1 shown in FIG. 30b includes various email, upload, input, and amend operations that are steps in the business workflow that are now captured and controlled according to the graph. As noted above, this allows the state of the workflow to be inferred from the position in the graph. Sub-workflow 2 shown in FIG. 30c illustrates a sub-process in which two parallel input operations are performed.

Figure 30D:
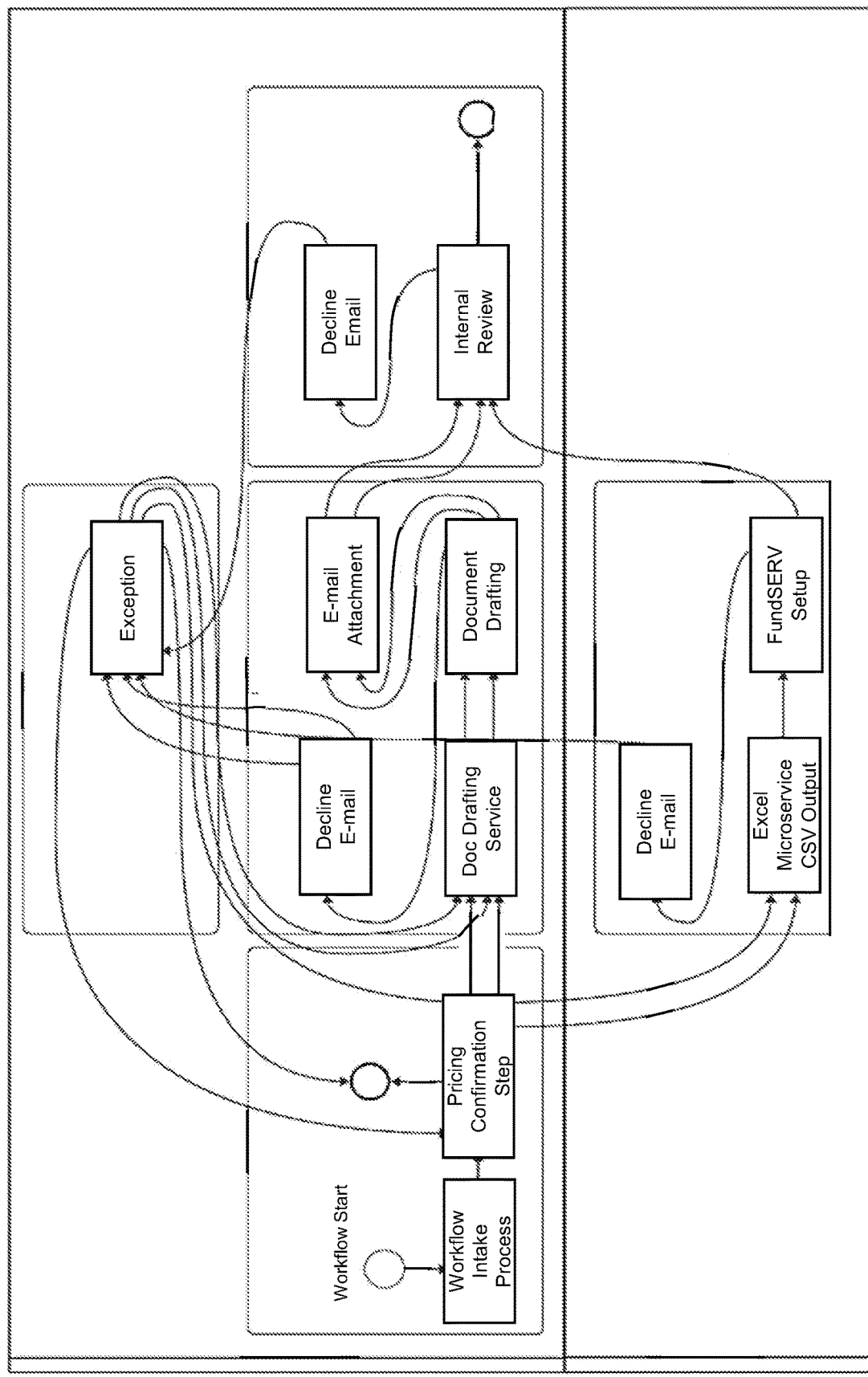

FIG. 30d illustrates another process workflow as a graph, in this example including distribution, issuance, and approval for a structured notes workflow. The process in this example includes approval of the structure and intent to sell, distributor selection and routing, document drafting (prospectus, etc.), and final approval. It may be noted that the graph structure facilitates parallelization, amendments, and automated alerts.

By utilizing a graph structure for the business process workflow, the topic (issued via the distribution cluster 112) implies the state and thus processes do need to be linear. This graphical representation also permits graphs to be chained together, allowing for sub-flows as discussed above. Documents in the process can pass through the workflow via the graph edges to microservices and users that receive and/or interact with the document (e.g., to add a signature).

Figure 31:
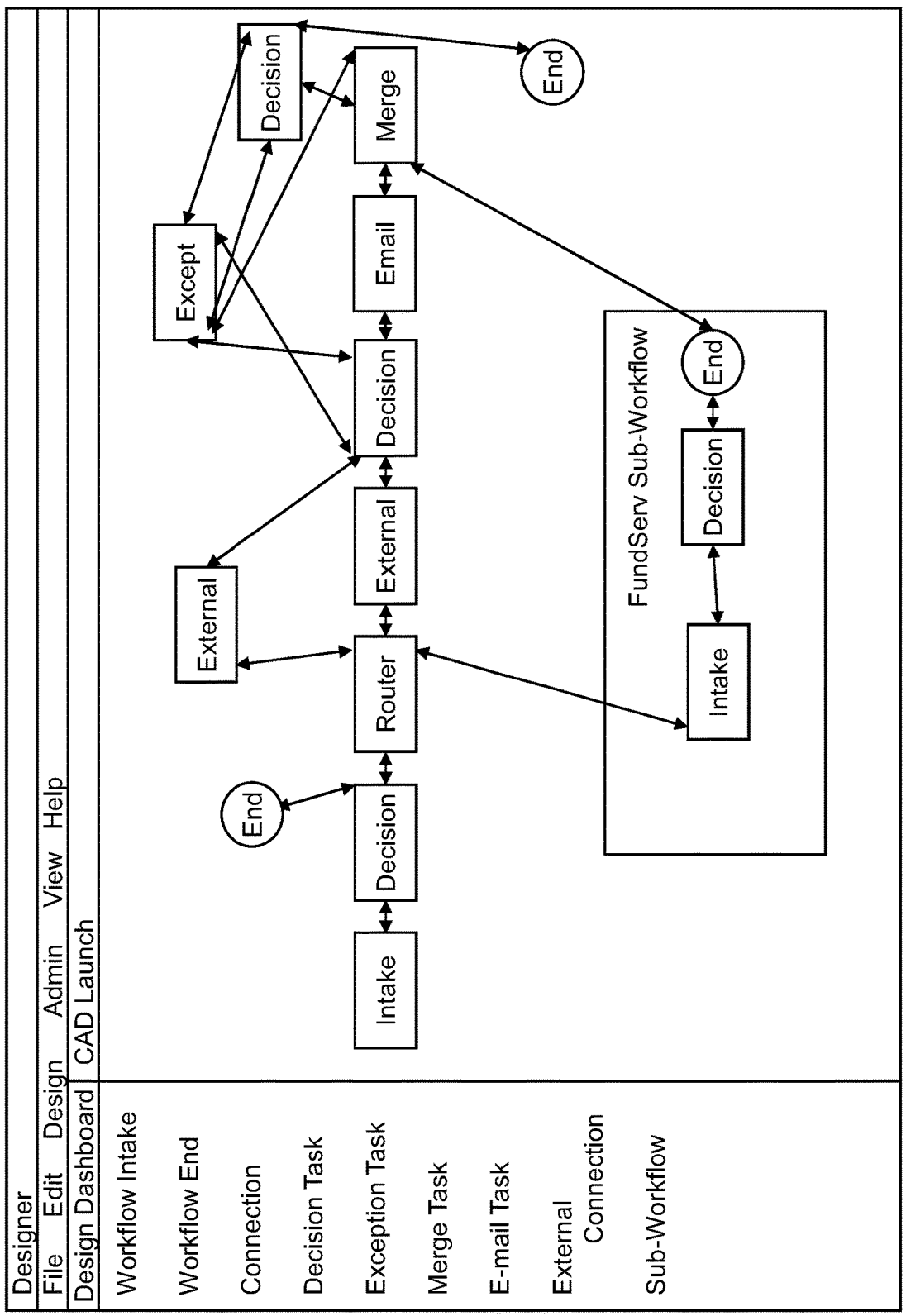
FIG. 31 is an example of a user interface for designing a business process workflow.

FIG. 31 is an example of a user interface 200 for designing a business process workflow. The user interface 260 provides a "canvass" with an example of a graph that has been built from a number of nodes and indicating various tasks. Each block 262 added to the user interface 260 can represent a node in the workflow and can be connected to other blocks 262. The connection points 264 between nodes and edges can be considered tasks 266. The illustrated graph also includes a sub-workflow 268 that can be defined separately and reused where applicable in other workflows. It can be appreciated that by representing a workflow as a graph and storing same in a graph database, designing and visualizing the workflow is facilitated by connecting blocks 262 (nodes) and tasks 266 (edges). This allows the topic associate with a node to imply the state of the workflow at any given time in the process, while enabling not linear workflows to be implemented (e.g., to obtain multiple signature or contributions to a document in the workflow). Moreover, the graph structure facilitates onboarding the microservices 116 by associating the microservices 116 with tasks 266, connection points 264, or blocks 262 in the graph. In this way, the user interface 260 provides an intuitive way to build the workflow, with different types of nodes available from a library, e.g., "intake", and "decision" as shown in FIG. 31. The workflow, once designed in this way, can be exported to an XML or similar file format to provide an output that can be used to create the graph structure to be stored in the workflow graph database 106.

Figure 32:
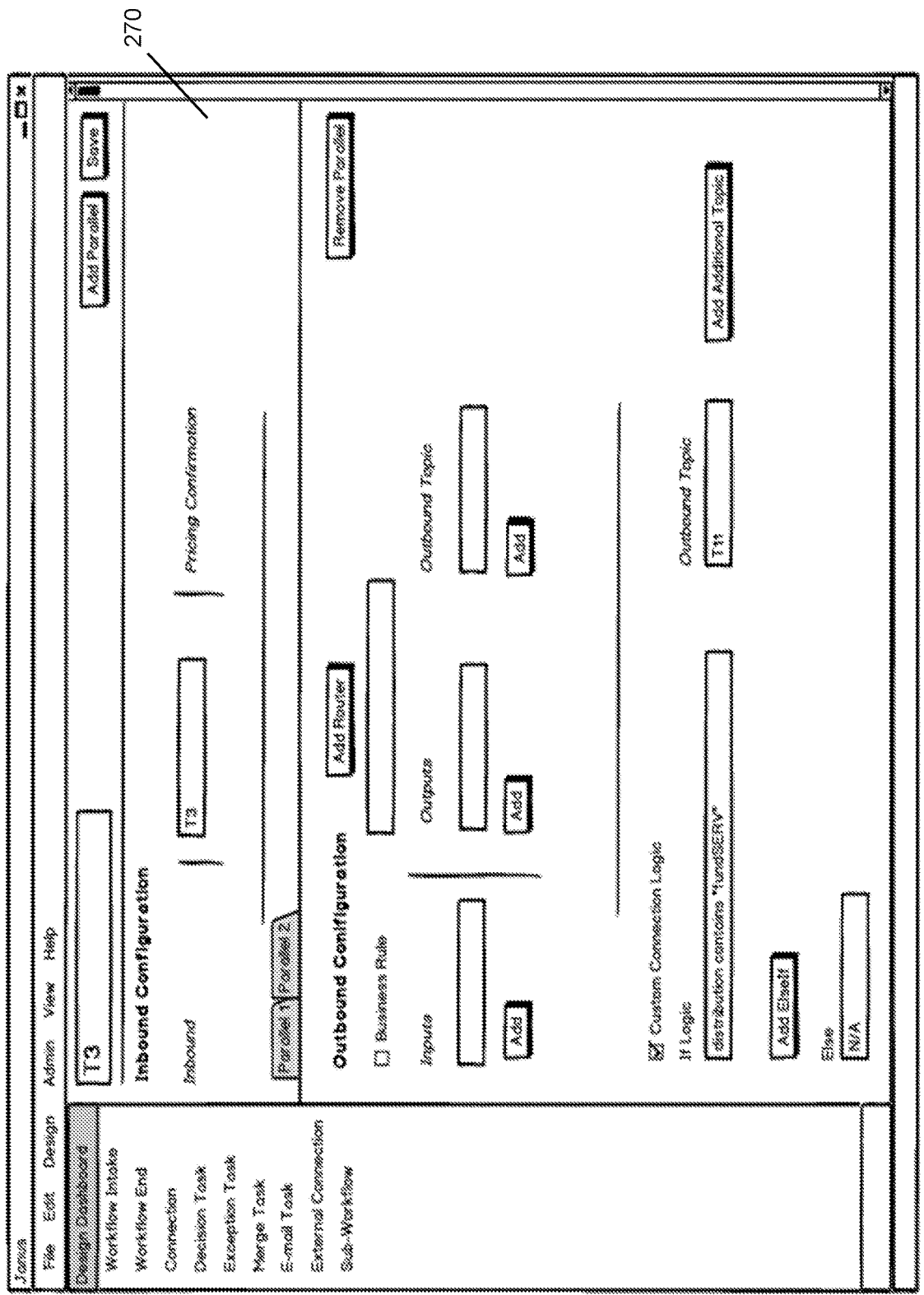
FIG. 32 is an example of a design dashboard user interface for designing a business process workflow.
Figure 33:
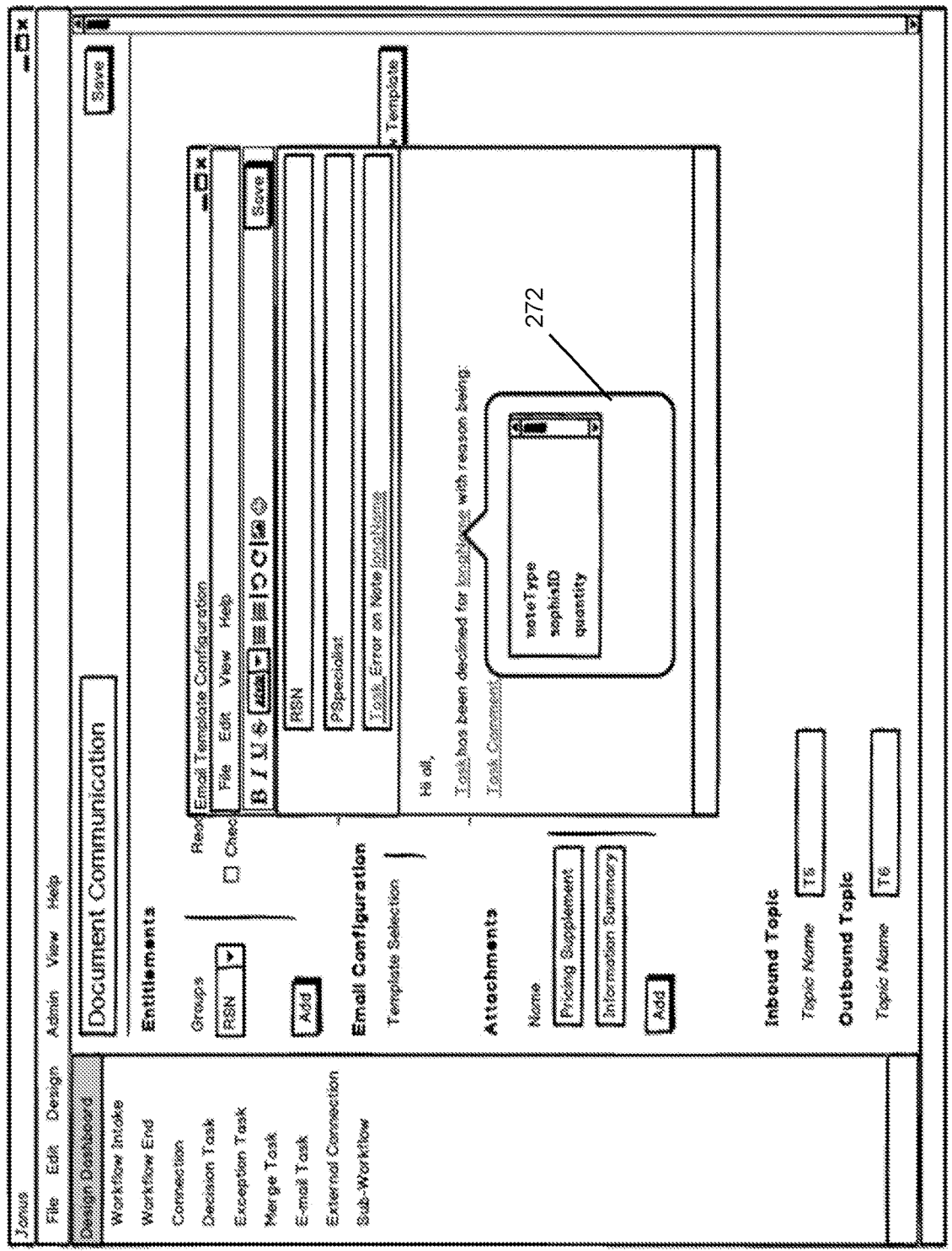
FIG. 33 is an example of a document communication dashboard user interface for defining communication configurations for communications integrated into a business process workflow.

FIG. 32 is an example of a design dashboard 270 user interface for designing a business process workflow. The dashboard 270 enables users to drill down into a topic and define inbound and outbound configurations, including applying business rules and defining inputs and outputs. For example, as shown in FIG. 33, a document communication configuration tool 272 can also be provided, which enables users to define email template configurations for communications that are integrated into the workflow. It can be appreciated that the dashboard user interfaces 260, 270 can also provide other dashboards, such as a workflow dashboard showing multiple workflows and sub-workflows with administrative tools and the ability to publish a workflow once designed. The UI design tool can integrate with an underlying state machine provided by the business process platform 22 to store the published workflow as a graph and traverses the graph, distribute/exchange documents, and employ microservices according to the implied state of the graph as discussed above.

Figure 34:
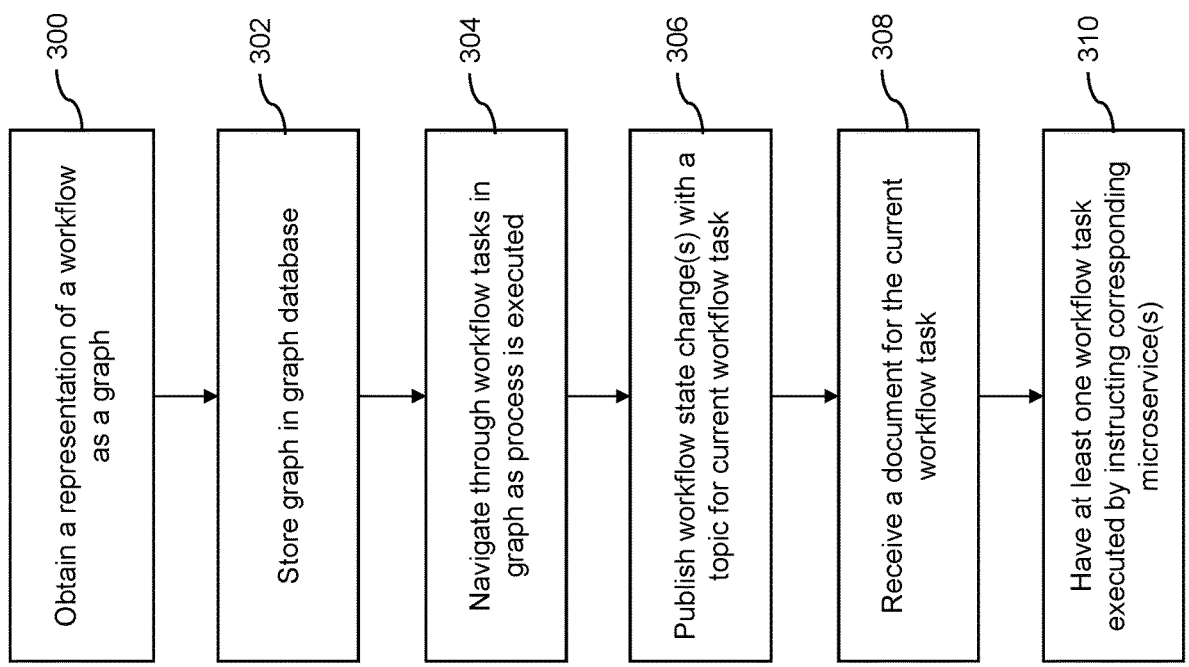
FIG. 34 is a flow diagram of an example of computer executable instructions for executing a process workflow.

Referring to FIG. 34, an example embodiment of computer executable instructions for executing a process workflow using the business process platform 22 is shown. At block 300, the business process platform 22 obtains a representation of a workflow as a graph. This can be obtained from an external source or created using the user interface 200. It can be appreciated that, as discussed above, the user interface 200 can be provided as a tool in the business process workflow UI 24 that is integrated in the application development environment 12 of an enterprise system or can be provided as a stand-alone tool. At block 302 the graph is stored in the graph database 106. The graph includes a configuration of microservices and other operations that are triggered or implied by the state of the graph and the platform 22 can navigate through the workflow tasks in the graph as the process is executed at block 304, by using the workflow navigator service 108, the workflow routing service 110, the distribution cluster 112 and by accessing the federated microservice(s) 116 according to the configuration implied by the graph.

At block 306 the workflow state change(s) can also be published with a topic for the current workflow task. This implies the state of the state machine implemented by the business process platform 22 and allows operations associated with the workflow to be controlled and implemented, e.g., having a document signed, verifying a payment, etc. At block 308 a document for the current workflow task, such as a form being filled out or a transaction being completed is received or otherwise handled by the business process platform 22. At block 310, at least one workflow task is executed by instructing a corresponding microservice 116. It can be appreciated that blocks 304, 306, 308, and 310 can be done in parallel or linearly depending on the configuration of the workflow and by storing the workflow as a graph the execution of the workflow is not constrained by a linear flow. That is, multiple workflow topics or tasks can be implemented in parallel without departing from the progression of the workflow being executed.

Figure 35:
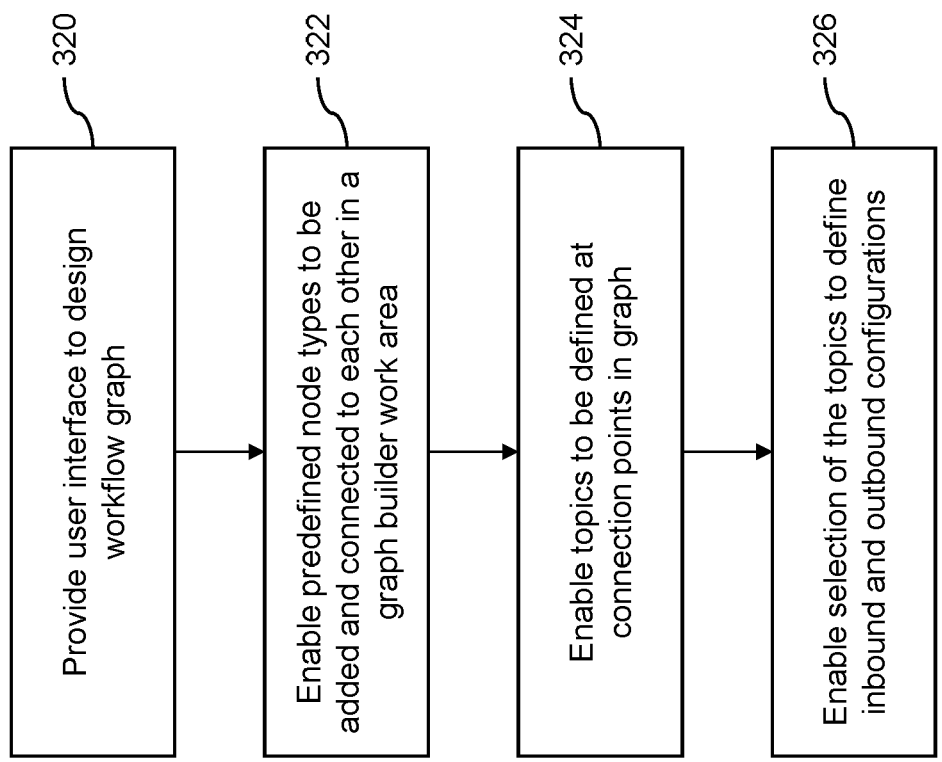
FIG. 35 is a flow diagram of an example of computer executable instructions for designing a business process workflow.

FIG. 35 is a flow diagram of an example of computer executable instructions for designing a business process workflow, e.g., using the user interface 260. At block 320, the user interface 260 is provided to a user to enable the workflow graph to be designed, e.g., as shown in FIG. 31. At block 322, predefined node types can be added and connected to each other in a graph builder work area or canvass as described above. This enables the workflow visualization shown in FIG. 31 and ultimately as shown in FIG. 30 for a complete workflow. At block 324, topics can be defined at the connection points in the graph, with edges representing tasks to be executed. The topics imply the state of the process and can inform the state machine provided by the business process platform 22. At block 326, the user interface 260 can allow selection of the topics to define inbound and outbound configurations, as shown in FIGS. 32 and 33 described above. In this way, the user interface 260 provides a tool to allow users to visualize, design, and ultimately implement a business process workflow as a graph that is then stored as a graph to intuitively inform the user or other administrators of the workflow of the progress and states associated with the workflow.

Figure 36:
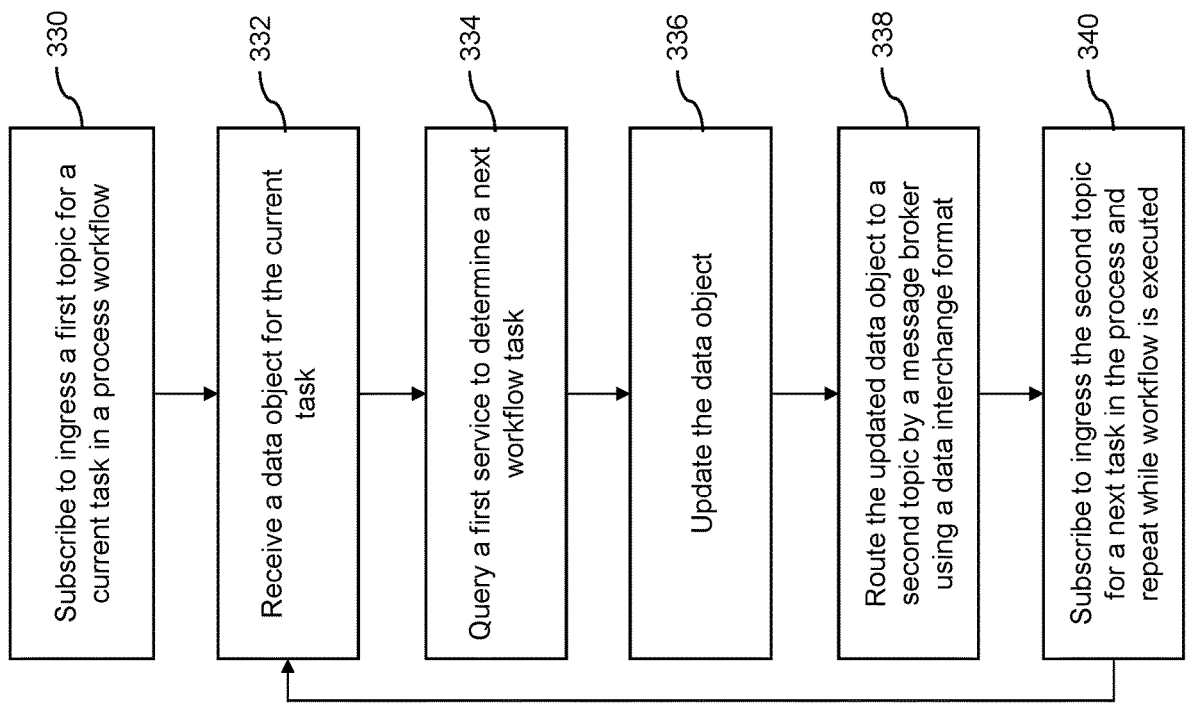
FIG. 36 is a flow diagram of an example of computer executable instructions for executing a dynamic routing service.

FIG. 36 is a flow diagram of an example of computer executable instructions for executing dynamic routing, e.g., using the message broker 146 and routing service 110. At block 330, the routing service 110 subscribes to ingress a first topic for a current task in a process workflow. At block 332, the routing service 110 receives a data object (e.g., a document, email, etc.) for the current task and queries a first service (e.g., the navigation service 108) at block 334 to determine a next workflow task. The next workflow task has been translated by the first service from a workflow graph to a file and data interchange format as illustrated in FIG. 7 described above. At block 336 the data object is updated, and the updated object is routed to a second topic by the message broker 146 at block 338, using a data interchange format such as JSON. At block 340, the routing service 110 also subscribes to ingress the second topic for a next task in the process workflow and repeats blocks 332-338 while the workflow is executed to utilize the translated tasks from the navigation service 108 to traverse the process workflow as defined by the graph stored in the workflow graph database 106.

Figure 37:
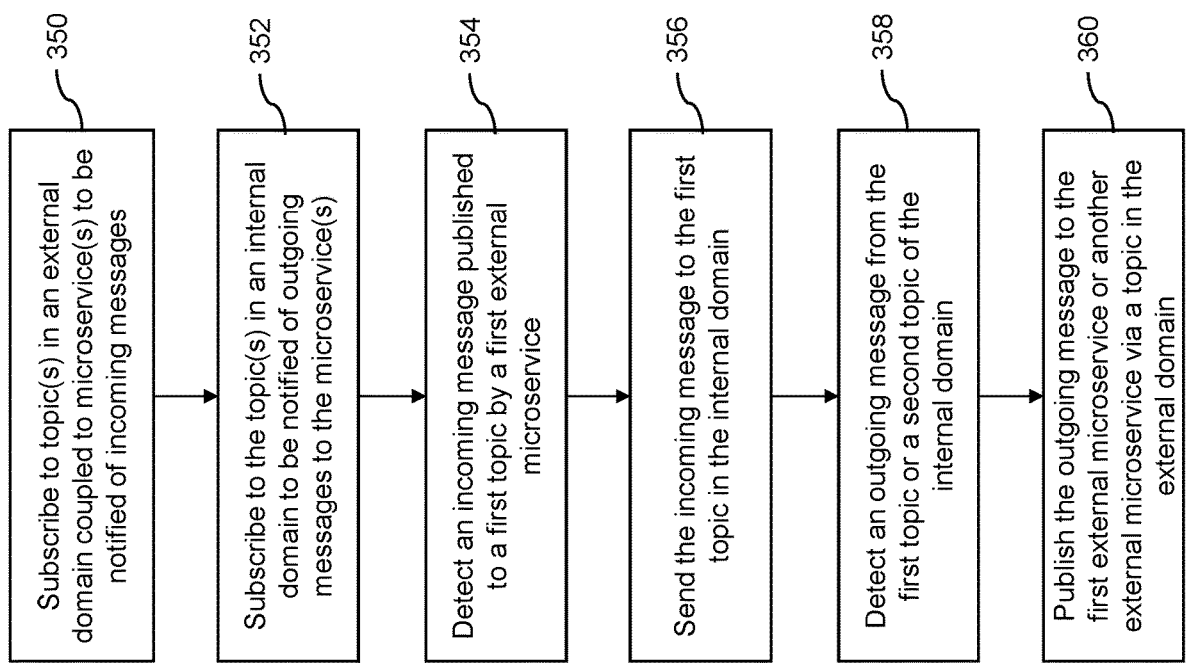
FIG. 37 is a flow diagram of an example of computer executable instructions for integrating external services into a process workflow environment.

FIG. 37 is a flow diagram of an example of computer executable instructions for integrating external services into a process workflow environment, e.g., using the integration service 122. At block 350, the integration service 122 subscribes to topics in the external domain 226, which is coupled to one or more microservices 116 as shown in FIG. 24. This enables the integration service 122 to be notified of incoming messages from the microservices 116. At block 352, the integration service 122 also subscribes to the topics in the internal domain 228 to be notified of outgoing messages to the microservices 116. In this way, at block 354, the integration service 122 can detect an incoming message published to a first topic by an external microservice 116 and, at block 356, send the incoming message to the first topic in the internal domain 228. At block 358, the integration service 122 also detects an outgoing message from the first topic or a second topic of the internal domain 228 (e.g., as illustrated in FIGS. 24 and 25) and, at block 360, publishes the outgoing message to the first external microservice 116 or another external microservice 116 via a topic in the external domain 226.

Figure 38:
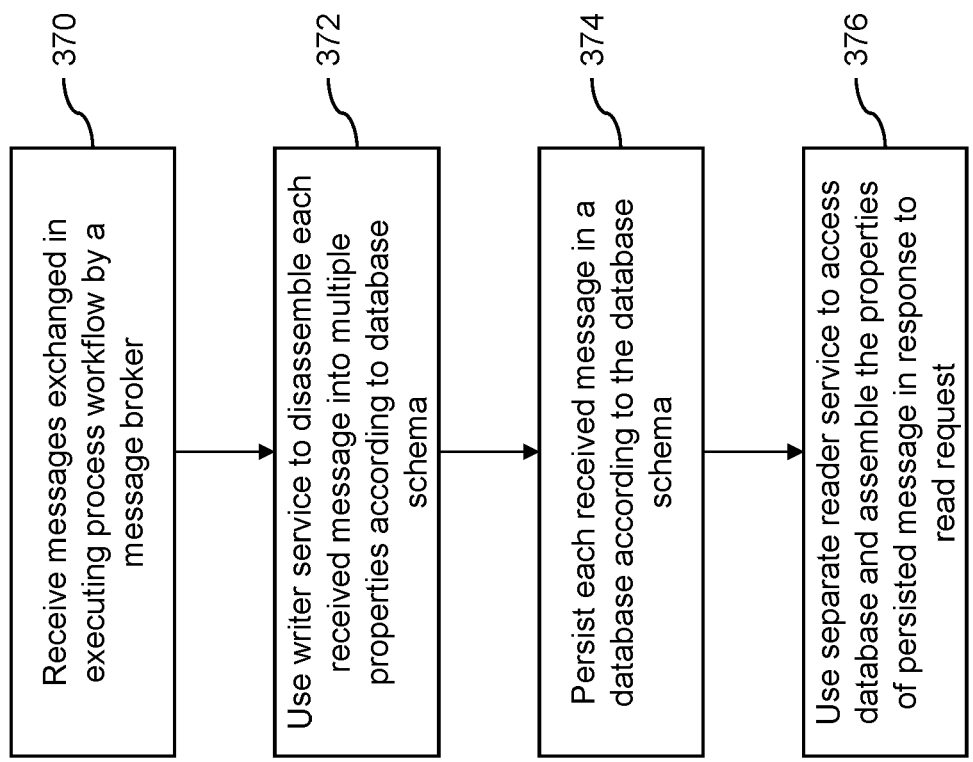
FIG. 38 is a flow diagram of an example of computer executable instructions for persisting data generated in executing in a process workflow.

FIG. 38 is a flow diagram of an example of computer executable instructions for persisting data generated in executing in a process workflow, e.g., using the state service 114, state query service 150 and state command service 152. At block 370, the state service 114 receives all messages exchanged, in executing a process workflow, by the message broker 146. The state service 114 uses a writer service such as the state command service 152 at block 372 to disassemble each received message into multiple properties (e.g., as shown in FIG. 27) according to the database schema being used. Each received message is persisted to the database server 104 at block 274 according to the database schema 374. At block 376, either in parallel or at some other time, the state service 114 after receiving a read request, uses a separate reader service such as the state query service 150 to access the database server 104 and assemble the properties of a persisted message to provide the information represented by the properties, e.g., a document, email, etc. and the data contained in certain fields as of a certain date and time as describe above.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for persisting data generated in executing a process workflow, the device comprising:
   a processor;
   a communications module coupled to the processor; and
   a memory coupled to the processor, the memory storing computer executable instructions that when executed by the processor cause the processor to:
      receive via the communications module messages exchanged in executing the process workflow by a message broker;
      use a writer service to disassemble each received message into multiple properties according to a database schema and persist the received message in a database according to the database schema via the communications module; and
      use a reader service to access the database and assemble the multiple properties of a first persisted message, in response to a read request received via the communications module, wherein the reader service is separate from the writer service.

2. The device of claim 1, wherein the computer executable instructions further cause the processor to:
   receive a temporal query for the first or a second persisted message comprising an as-of time; and
   assemble the first or second persisted message according to the multiple properties of that message at the as-of time.

3. The device of claim 2, wherein the as-of time corresponds to a given point in a graph defining the process workflow.

4. The device of claim 1, wherein at least one of the received messages is provided by a routing service used to perform dynamic routing on documents in the process workflow.

5. The device of claim 1, wherein at least one of the received messages is provided by an integration service used to integrate external microservices used in executing the process workflow.

6. The device of claim 1, wherein the database schema adheres to a data dictionary defining the schema for a record in the database.

7. The device of claim 1, wherein the computer executable instructions further cause the processor to:
enable different instances of a same category of objects to have different runtime properties.

8. The device of claim 1, wherein the separate reader and writer services enables targeted scaling to permit differing read and write workloads.

9. The device of claim 1, wherein the computer executable instructions further cause the processor to:
serialize write requests through the message broker without losing data.

10. The device of claim 1, wherein the database schema uses the following set of logical entities to describe and capture information in the messages:
a quantum corresponding to an object;
a quantum type corresponding to a unique name identifying a category of objects;
at least one quantum property corresponding to a characteristic of the object;
a quantum state corresponding to the object in observation, created when the quantum acquires information; and
a state vector recording values assigned to a quantum property for a quantum state.

11. A method of persisting data generated in executing a process workflow, the method executed by a device having a communications module and comprising:
receiving via the communications module messages exchanged in executing the process workflow by a message broker;
using a writer service to disassemble each received message into multiple properties according to a database schema and persist the received message in a database according to the database schema via the communications module; and
using a reader service to access the database and assemble the multiple properties of a first persisted message, in response to a read request received via the communications module, wherein the reader service is separate from the writer service.

12. The method of claim 11, further comprising:
receiving a temporal query for the first or a second persisted message comprising an as-of time; and
assembling the first or second persisted message according to the multiple properties of that message at the as-of time.

13. The method of claim 12, wherein the as-of time corresponds to a given point in a graph defining the process workflow.

14. The method of claim 11, wherein at least one of the received messages is provided by a routing service used to perform dynamic routing on documents in the process workflow.

15. The method of claim 11, wherein at least one of the received messages is provided by an integration service used to integrate external microservices used in executing the process workflow.

16. The method of claim 11, further comprising:
enabling different instances of a same category of objects to have different runtime properties.

17. The method of claim 11, wherein the separate reader and writer services enables targeted scaling to permit differing read and write workloads.

18. The method of claim 11, further comprising:
serializing write requests through the message broker without losing data.

19. The method of claim 11, wherein the database schema uses the following set of logical entities to describe and capture information in the messages:
a quantum corresponding to an object;
a quantum type corresponding to a unique name identifying a category of objects;
at least one quantum property corresponding to a characteristic of the object;
a quantum state corresponding to the object in observation, created when the quantum acquires information; and
a state vector recording values assigned to a quantum property for a quantum state.

20. A non-transitory computer readable medium for persisting data generated in executing a process workflow, the computer readable medium comprising computer executable instructions for:
receiving via a communications module messages exchanged in executing the process workflow by a message broker;
using a writer service to disassemble each received message into multiple properties according to a database schema and persist the received message in a database according to the database schema via the communications module; and
using a reader service to access the database and assemble the multiple properties of a first persisted message, in response to a read request received via the communications module, wherein the reader service is separate from the writer service.

* * * * *